(12) United States Patent
Marx et al.

(10) Patent No.: US 11,237,256 B2
(45) Date of Patent: Feb. 1, 2022

(54) METHODS AND SYSTEMS FOR DITHERING ACTIVE SENSOR PULSE EMISSIONS

(71) Applicant: Waymo LLC, Mountain View, CA (US)

(72) Inventors: Michael Marx, Mountain View, CA (US); Pierre-Yves Droz, Los Altos, CA (US)

(73) Assignee: Waymo LLC, Mountain View, CA (US)

( * ) Notice: Subject to any disclaimer, the term of this patent is extended or adjusted under 35 U.S.C. 154(b) by 689 days.

(21) Appl. No.: 16/134,985

(22) Filed: Sep. 19, 2018

(65) Prior Publication Data

US 2021/0396845 A1 Dec. 23, 2021

(51) Int. Cl.
| | |
|---|---|
| G01S 7/484 | (2006.01) |
| G01S 7/481 | (2006.01) |
| G01S 7/491 | (2020.01) |
| G01S 17/10 | (2020.01) |

(52) U.S. Cl.
CPC .............. *G01S 7/484* (2013.01); *G01S 7/481* (2013.01); *G01S 7/491* (2013.01); *G01S 17/10* (2013.01)

(58) Field of Classification Search
CPC .......... G01S 7/484; G01S 7/481; G01S 7/491; G01S 17/10; G01S 17/08; G01S 17/42; G01S 17/06; G01S 17/04; G01S 17/02; G01S 7/4911; G01S 7/4912; G01S 7/4913; G01S 7/4914; G01S 7/4915; G01S 7/483; G01S 7/4861; G01S 7/4863; G01S 7/4865; G01S 7/4811; G01C 3/06; G01C 3/02;

(Continued)

(56) References Cited

U.S. PATENT DOCUMENTS

| | | |
|---|---|---|
| 5,298,905 A | 3/1994 | Dahl |
| 9,964,632 B1 | 5/2018 | Droz et al. |
| 2016/0259038 A1 | 9/2016 | Retterath et al. |

(Continued)

FOREIGN PATENT DOCUMENTS

| | | |
|---|---|---|
| JP | 2017090144 A | 5/2018 |
| WO | 2018044481 A1 | 3/2018 |

(Continued)

OTHER PUBLICATIONS

International Search Report & Written Opinion for International Application No. PCT/2019/051847, dated Jan. 3, 2020.

*Primary Examiner* — John R Lee
(74) *Attorney, Agent, or Firm* — McDonnell Boehnen Hulbert & Berghoff LLP

(57) ABSTRACT

One example device comprises a plurality of emitters including at least a first emitter and a second emitter. The first emitter emits light that illuminates a first portion of a field-of-view (FOV) of the device. The second emitter emits light that illuminates a second portion of the FOV. The device also comprises a controller that obtains a scan of the FOV. The controller causes each emitter of the plurality of emitters to emit a respective light pulse during an emission time period associated with the scan. The controller causes the first emitter to emit a first-emitter light pulse at a first-emitter time offset from a start time of the emission time period. The controller causes the second emitter to emit a second-emitter light pulse at a second-emitter time offset from the start time of the emission time period.

29 Claims, 7 Drawing Sheets

(58) Field of Classification Search
CPC .......... G05D 1/02; G06K 9/78; H01L 27/146; H01L 27/14625
See application file for complete search history.

(56) References Cited

U.S. PATENT DOCUMENTS

| | | |
|---|---|---|
| 2017/0307736 A1 | 10/2017 | Donovan |
| 2018/0120857 A1 | 5/2018 | Kappauf et al. |
| 2018/0259645 A1 | 9/2018 | Shu et al. |
| 2018/0267152 A1* | 9/2018 | McMichael ............. G01S 17/14 |
| 2019/0353754 A1* | 11/2019 | Namba ................... G01S 7/484 |

FOREIGN PATENT DOCUMENTS

| | | |
|---|---|---|
| WO | 2018048584 A1 | 3/2018 |
| WO | 2018101262 A1 | 6/2018 |
| WO | 2018125823 A1 | 7/2018 |

* cited by examiner

500

| TRANSMITTING A FIRST PLURALITY OF BEAMS TOWARD RESPECTIVE PORTIONS OF A FIELD-OF-VIEW (FOV) DURING A FIRST EMISSION TIME PERIOD ASSOCIATED WITH A FIRST SCAN OF THE FOV | 502 |

↓

| ILLUMINATING A FIRST PORTION OF THE FOV AT A FIRST-PORTION TIME OFFSET, AND A SECOND PORTION OF THE FOV AT A SECOND-PORTION TIME OFFSET | 504 |

METHODS AND SYSTEMS FOR DITHERING ACTIVE SENSOR PULSE EMISSIONS

BACKGROUND

Active sensors, such as light detection and ranging (LIDAR) sensors, radio detection and ranging (RADAR) sensors, sound navigation and ranging (SONAR) sensors, among others, are sensors that can scan a surrounding environment by emitting signals toward the surrounding environment and detecting reflections of the emitted signals.

For example, a LIDAR sensor can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a device comprises a plurality of emitters including at least a first emitter and a second emitter. The first emitter emits light that illuminates a first portion of a field-of-view (FOV) of the device. The second emitter emits light that illuminates a second portion of the FOV. The device also comprises a controller that obtains a scan of the FOV. Obtaining the scan involves the controller causing each emitter of the plurality of emitters to emit a respective light pulse during an emission time period associated with the scan. Causing each emitter to emit the respective light pulse involves the controller causing the first emitter to emit a first-emitter light pulse at a first-emitter time offset from a start time of the emission time period, and causing the second emitter to emit a second-emitter light pulse at a second-emitter time offset from the start time of the emission time period.

In another example, a method involves causing a plurality of emitters to emit a plurality of light pulses during a first emission time period associated with a first scan of a field-of-view (FOV). A first emitter of the plurality of emitters may be configured to illuminate a first portion of the FOV. A second emitter of the plurality of emitters may be configured to illuminate a second portion of the FOV. Causing the plurality of emitters to emit the plurality of light pulses may involve causing the first emitter to emit a first-emitter light pulse at a first-emitter time offset from an end time of the first emission time period, and causing the second emitter to emit a second-emitter light pulse at a second-emitter time offset from the end time of the first emission time period. The method also involves obtaining the first scan based on measurements of light from the FOV received by a plurality of detectors during a first detection time period that begins after the end time of the first emission time period.

In yet another example, a device includes a transmitter that emits a plurality of light beams during a first emission time period associated with a first scan of a field-of-view (FOV) of the device. The plurality of light beams is spatially arranged to illuminate respective portions of the FOV. The first emission time period has a start time and an end time. The transmitter emits a first light beam of the first plurality of light beams toward a first portion of the FOV at a first-portion time offset from the start time of the first emission time period. The transmitter emits a second light beam of the first plurality of light beams toward a second portion of the FOV at a second-portion time offset from the start time of the first emission time period. The device also includes a receiver that intercepts light from the FOV illuminated by the transmitter.

In still another example, a device comprises a controller that obtains a sequence of scans of a field-of-view (FOV) of the device. The device also comprises a transmitter that emits, for a first scan of the sequence of scans, a first plurality of light pulses in a particular spatial arrangement and according to a first plurality of time offsets between emission times of the plurality of light pulses. The device also comprises a receiver that includes a plurality of detectors. Each detector of the plurality of detectors may be aligned with a respective portion of the FOV illuminated by a respective light pulse of the first plurality of light pulses.

In still another example, a system comprises means for causing a plurality of emitters to emit a plurality of light pulses during a first emission time period associated with a first scan of a field-of-view (FOV). A first emitter of the plurality of emitters may be configured to illuminate a first portion of the FOV. A second emitter of the plurality of emitters may be configured to illuminate a second portion of the FOV. Causing the plurality of emitters to emit the plurality of light pulses may involve causing the first emitter to emit a first-emitter light pulse at a first-emitter time offset from an end time of the first emission time period, and causing the second emitter to emit a second-emitter light pulse at a second-emitter time offset from the end time of the first emission time period. The system also comprises means for obtaining the first scan based on measurements of light from the FOV received by a plurality of detectors during a first detection time period that begins after the end time of the first emission time period.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
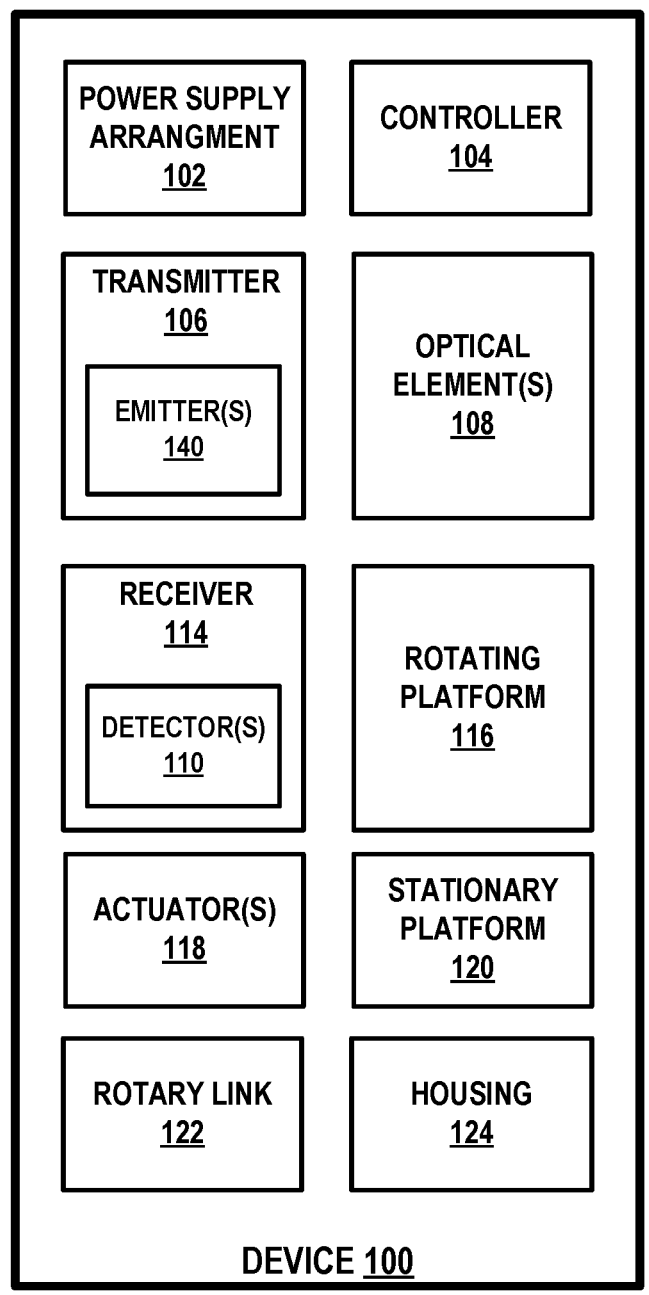
FIG. 1 is a simplified block diagram of a device, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein and illustrated in the figures, can be arranged, substituted, combined, separated, and designed in a wide variety of different configurations.

I. OVERVIEW

Within examples, an active sensing system (e.g., LIDAR, RADAR, SONAR, etc.) may include a transmitter that transmits a plurality of signals (e.g., beams, pulses, etc.) spatially arranged (e.g., in a grid arrangement or other arrangement of adjacent signals) to scan respective portions of a field-of-view (FOV).

In one example, a LIDAR device may include multiple transmit/receive channels arranged to scan respective portions of a FOV. For instance, the LIDAR device may include a transmitter that transmits a plurality of light beams toward the FOV. Each light beam may illuminate a respective portion of the FOV. The LIDAR device may also include a plurality of detectors and a lens that focuses light from the FOV for receipt by the plurality of detectors. A first detector of the plurality may be arranged to intercept a first portion of the focused light from a first portion of the FOV that was illuminated by a first light beam of the plurality of light beams. Similarly, a second detector may be arranged to intercept a second portion of the focused light from a second portion of the FOV that was illuminated by a second light beam, and so on. Thus, each detector may be aligned with a corresponding transmitted light beam to define a respective transmit/receive channel of the LIDAR device.

With this arrangement, the multiple transmit/receive channels can interrogate different portions of the FOV. For instance, each channel can emit a pulse of light during an emission time period, and then "listen" for a reflected pulse during a detection time period following the emission time period. In some implementations, the LIDAR device may then perform a subsequent scan of the FOV, which similarly includes another emission time period followed by another detection time period, and so on. With this arrangement for instance, the LIDAR device can obtain a sequence of scans (e.g., periodically) of the FOV.

In some scenarios, a reflected portion of light that was originally transmitted by a particular channel may be detected in one or more other channels (e.g., neighboring channels that scan portions of the FOV adjacent to the portion scanned by the particular channel), thereby resulting in spurious signal detection (e.g., "cross-talk") by the other channel(s). Various factors may cause such cross-talk, such as optical distortions in the lens, distortions caused by dust particles on the lens, and/or reflectivity characteristics of objects in the scanned environment, among other factors.

In one scenario, transmitted light in a particular channel may be reflected by a retroreflector in a portion of the FOV scanned by the particular channel. A retroreflector may include a device or surface that reflects a relatively higher fraction of incident light back (e.g., into a relatively narrower cone, etc.) toward its source as compared to other types of reflectors. For instance, a road traffic sign may be coated with a retroreflector to improve visibility of the sign to vehicle drivers on the road. In this scenario, some portions of the (strong) reflected signal from the retroreflector may have sufficient amounts of energy to be detected by other (e.g., neighboring) channels (spuriously) as well as the particular channel that illuminated the retroreflector.

By way of example, a retroreflector may be located within a portion of the FOV scanned by a first channel. In this example, a light pulse emitted by the first channel may be reflected by the retroreflector, and the reflected light pulse may then be detected at the first channel as a relatively strong signal. In this example, a time difference between the emission time of the emitted light pulse and the detection time of the reflected light pulse can be used to determine that the retroreflector is at a distance of 50 meters from the LIDAR device. However, as noted above, N additional channels may also receive portions of the reflected light pulse from the retroreflector as spurious signals. If the N additional channels had also emitted N respective light pulses at the same emission time as the light pulse of the first channel, then the spurious signals detected by the N channels may be interpreted as reflections of the N light pulses from objects (at a distance of 50 meters) within respective portions of the FOV scanned by the N channels. As a result, the spurious signals may prevent or interfere with detection of actual objects present at the same distance of 50 meters within the respective portions of the FOV scanned by the N additional channels. For instance, a computing system that processes data from the LIDAR to generate a 3D map of the environment may render a map that shows "ghost" retroreflectors at the 50 meter distance (e.g., instead of showing objects actually present at this distance).

Reducing this type of cross-talk error may be desirable in some applications. For example, a LIDAR-equipped vehicle may be configured to use the LIDAR to detect objects (e.g., other vehicles, pedestrians, etc.) in the environment of the vehicle. In this example, if the LIDAR is unable to scan significant portions of the environment near every retroreflector (e.g., objects adjacent to a stop sign, etc.), then the LIDAR may be less reliable for object detection and/or operation of the vehicle.

To mitigate the effects of such cross-talk, in some examples, the LIDAR device may include one or more light filters interposed between the lens and the plurality of detectors. The light filter(s) may reduce (or prevent) relatively weak spurious signals propagating toward an unintended transmit/receive channel. However, an extent of filtration by the light filter(s) may be limited to allow propagation of non-spurious signals through the light filter(s). Thus, the light filter(s) may still allow propagation of some (relatively stronger) spurious signals (e.g., having a similar amount of energy as that of non-spurious signals), such as spurious signals associated with retroreflectors for instance.

Accordingly, some implementations herein may involve operating a multi-channel active sensor (e.g., LIDAR, SONAR, etc.) to mitigate the effects of channel cross-talk associated with retroreflectors or other sources of spurious signals.

In a first example, one or more of the multiple transmit/receive channels of the LIDAR device described above can be configured to emit respective light pulses at different respective time offsets during a first emission time period of a first scan of the FOV of the LIDAR. For instance, a first channel may emit a light pulse near the beginning of the first emission time period, a second channel may emit a light pulse near the end of the first emission time period, and so on. After the first emission time period ends, the multiple channels of the LIDAR may then begin "listening" for reflections of their respective emitted light pulses during a first detection time period of the first scan. With this arrangement for instance, if a retroreflector present at a distance of 50 meters in a first portion of the FOV scanned by the first channel causes spurious signal detections at N other channels that scan other portions of the FOV, then the spurious signal detections may be mapped to a variety distances (e.g., 40-60 meters) due to the differences between the emission times of the first channel and the N channels. Thus, in this example, the LIDAR can improve the quality of object detection at the range of 50 meters by spreading the spurious signal detections associated with the retroreflector over a range of distances.

In a second example, where the LIDAR device obtain a sequence of scans of the FOV (e.g., periodically), the LIDAR device may be configured to adjust the respective emission time offsets assigned to a particular channel for each scan in the sequence. For instance, in a first scan of the sequence, the first channel may emit a light pulse near the beginning of the first emission time period and the second channel may emit a light pulse near the end of the first emission time period. Next, in a second scan subsequent to the first scan, the first channel may instead emit a light pulse near the end of a second emission time period of the second scan, and the second channel may instead emit a light pulse near the beginning of the second emission time period, and so on.

Thus, with this arrangement, the emission times used by a particular channel over the sequence of scans may be effectively dithered (e.g., relative to a start or end of the respective emission time periods of the sequence of scans). As a result, for instance, if the particular channel is "blinded" from detecting an object at a particular distance (e.g., 50 meters) during a first scan (due to a spurious signal from another channel), then the particular channel may be able to detect the object during a subsequent second scan (because the spurious signal will be instead mapped to a different distance in the second scan). For instance, actual signals reflected by an object illuminated by the particular channel may be detected repeatedly as being at the same particular distance during successive scans by the particular channel (e.g., "coherent" detections). Whereas, spurious signals caused by a retroreflector illuminated by another channel may be detected repeatedly as being at different distances (e.g., "incoherent" detections) during the successive scans.

In some implementations, the time offsets assigned to a particular channel in each respective emission time period of the sequence of scans can be based on a pseudo-random time offset sequence. For example, a computing system can determine the pseudo-random time offset sequence that is applied to one or more particular channels prior to the LIDAR performing the sequence of scans. However, in other implementations, varying the time offsets from one scan to another can be performed in a variety of different ways.

II. EXAMPLE SENSOR SYSTEMS AND DEVICES

A non-exhaustive list of example sensors that can be employed herein includes LIDAR sensors, RADAR sensors, SONAR sensors, active IR cameras, and microwave cameras, among others. To that end, some example sensors herein may include active sensors that emit a signal (e.g., visible light signal, invisible light signal, radio-frequency signal, microwave signal, sound signal, etc.), and then detect reflections of the emitted signal from the surrounding environment.

FIG. 1 is a simplified block diagram of a device 100, according to example embodiments. As shown, device 100 includes a power supply arrangement 102, a controller 104, a transmitter 106, one or more optical elements 108, a receiver 114, a rotating platform 116, one or more actuators 118, a stationary platform 120, a rotary link 122, and a housing 124. In some embodiments, device 100 may include more, fewer, or different components. Additionally, the components shown may be combined or divided in any number of ways.

Power supply arrangement 102 may be configured to supply, receive, and/or distribute power to various components of device 100. To that end, power supply arrangement 102 may include or otherwise take the form of a power source (e.g., battery cells, etc.) disposed within device 100 and connected to various components of the device 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which device 100 is mounted) and to transmit the received power to various components of device 100.

Controller 104 may include one or more electronic components and/or systems arranged to facilitate certain operations of device 100. Controller 104 may be disposed within device 100 in any feasible manner. In one embodiment, controller 104 may be disposed, at least partially, within a central cavity region of rotary link 122.

In some examples, controller 104 may include or otherwise be coupled to wiring used for transfer of control signals to various components of device 100 and/or for transfer of data from various components of device 100 to controller 104. For example, the data that controller 104 receives may include sensor data indicating detections of signals by receiver 114, among other possibilities. Moreover, the control signals sent by controller 104 may operate various components of device 100, such as by controlling emission of signals by transmitter 106, controlling detection of signals by the receiver 114, and/or controlling actuator(s) 118 to rotate rotating platform 116, among other possibilities.

To that end, in some examples, controller 104 may include one or more processors, data storage, and program instructions (stored on the data storage) executable by the one or more processors to cause device 100 to perform the various operations described herein. The processor(s) may comprise one or more general-purpose processors and/or one or more special-purpose processors. To the extent that controller 104 includes more than one processor, such processors could work separately or in combination. The data storage, in turn, may comprise one or more volatile and/or one or more non-volatile storage components, such as optical, magnetic, and/or organic storage, and the data storage may be optionally integrated in whole or in part with the processor(s).

In some instances, the controller may communicate with an external controller or the like (e.g., a computing system arranged in a vehicle to which device 100 is mounted) so as to help facilitate transfer of control signals and/or data between the external controller and the various components of device 100.

Additionally or alternatively, in some examples, controller 104 may include circuitry wired to perform one or more of the operations described herein. For example, controller 104 may include one or more pulser circuits that provide pulse timing signals for triggering emission of pulses or other signals by transmitter 106. For instance, each pulser circuit may drive a respective emitter that provides one or more beams arranged to scan one or more respective portions of the FOV of device 100.

Additionally or alternatively, in some examples, controller 104 may include one or more special purpose processors, servos, or other types of controllers. For example, controller 104 may include a proportional-integral-derivative (PID) controller or other control loop feedback mechanism that operates actuator(s) 118 to cause the rotating platform to rotate at a particular frequency or phase. Other examples are possible as well.

Transmitter 106 may be configured to transmit signals toward an environment of device 100. As shown, transmitter 106 may include one or more emitters 140. Emitters 140 may include various types of emitters depending on a configuration of device 100.

In a first example, where device 100 is configured as a LIDAR device, transmitter 106 may include one or more light emitters 140 that emit one or more light beams and/or pulses having wavelengths within a wavelength range. The wavelength range could be, for example, in the ultraviolet, visible, and/or infrared portions of the electromagnetic spectrum. In some examples, the wavelength range can be a narrow wavelength range, such as that provided by lasers. A non-exhaustive list of example light emitters 140 includes laser diodes, diode bars, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), fiber lasers, and/or any other device configured to selectively transmit, reflect, and/or emit light to provide a plurality of emitted light beams and/or pulses.

In a second example, where device 100 is configured as an active infrared (IR) camera, transmitter 106 may include one or more emitters 140 configured to emit IR radiation to illuminate a scene. To that end, transmitter 106 may include any type of emitter (e.g., light source, etc.) configured to provide the IR radiation.

In a third example, where device 100 is configured as a RADAR device, transmitter 106 may include one or more antennas, waveguides, and/or other type of RADAR signal emitters 140, that are configured to emit and/or direct modulated radio-frequency (RF) signals toward an environment of device 100.

In a fourth example, where device 100 is configured as a SONAR device, transmitter 106 may include one or more acoustic transducers, such as piezoelectric transducers, magnetostrictive transducers, electrostatic transducers, and/or other types of SONAR signal emitters 140, that are configured to emit a modulated sound signal toward an environment of device 100. In some implementations, the acoustic transducers can be configured to emit sound signals within a particular wavelength range (e.g., infrasonic, ultrasonic, etc.). Other examples are possible as well.

In some implementations, device 100 (and/or transmitter 106) can be configured to emit a plurality of signals (e.g., light beams, IR signals, RF waves, sound waves, etc.) in a relative spatial arrangement that defines a FOV of device 100. For example, each beam (or signal) may be configured to propagate toward a portion of the FOV. In this example, multiple adjacent (and/or partially overlapping) beams may be directed to scan multiple respective portions of the FOV during a scan operation performed by device 100. Other examples are possible as well.

To that end, optical element(s) 108 can be optionally included in or otherwise coupled to transmitter 106 and/or receiver 114. In one example, optical element(s) 108 can be arranged to direct light from light sources or emitters in transmitter 106 toward the environment. In another example, optical element(s) 108 can be arranged to focus light from the environment toward receiver 114. As such, optical element(s) 108 may include any feasible combination of mirror(s), waveguide(s), lens(es), or other types optical components, that are arranged to guide propagation of light through physical space and/or to adjust certain characteristics of the light.

Receiver 114 may include one or more detectors 110 configured to detect reflections of the signals emitted by transmitter 106.

In a first example, where device 100 is configured as a RADAR device, receiver 114 may include one or more antennas (i.e., detectors 110) configured to detect reflections of the RF signal transmitted by transmitter 106. To that end, in some implementations, the one or more antennas of transmitter 106 and receiver 114 can be physically implemented as the same physical antenna structures.

In a second example, where device 100 is configured as a SONAR device, receiver 114 may include one or more sound sensors 110 (e.g., microphones, etc.) that are configured to detect reflections of the sound signals emitted by transmitter 106.

In a third example, where device 100 is configured as an active IR camera, receiver 114 may include one or more light detectors 110 (e.g., charge-coupled devices (CCDs), etc.) that are configured to detect a source wavelength of IR light transmitted by transmitter 106 and reflected off a scene toward receiver 114.

In a fourth example, where device 100 is configured as a LIDAR device, receiver 114 may include one or more light detectors 110 (e.g., photodiodes, avalanche photodiodes, etc.) that are arranged to intercept and detect reflections of the light pulses or beams emitted by transmitter 106 (and reflected from one or more objects in the environment of device 100). To that end, receiver 114 may be configured to detect light having wavelengths in the same wavelength range as the light emitted by transmitter 106. In this way, for instance, device 100 may distinguish reflected light pulses originated by device 100 from other light in the environment.

In some implementations, receiver 114 may include a photodetector array, which may include one or more detectors configured to convert detected light into an electrical signal indicating a measurement of the detected light. The photodetector array could be arranged in a variety ways. For instance, the detectors can be disposed on one or more substrates (e.g., printed circuit boards (PCBs), flexible PCBs, etc.) and arranged to detect incoming light that is traveling along an optical path of an optical lens of device 100 (e.g., optical element(s) 108). Also, such a photodetector array could include any feasible number of detectors aligned in any feasible manner. Additionally, the detectors in the array may take various forms. For instance, the detectors may take the form of photodiodes, avalanche photodiodes (APDs), silicon photomultipliers (SiPMs), single photon avalanche diodes (SPADs), multi-pixel photon counters (MPPCs), phototransistors, cameras, active pixel sensors (APS), charge coupled devices (CCD), cryogenic detectors, and/or any other sensor of light configured to receive focused light having wavelengths in the wavelength range of the emitted light.

In some examples, device 100 can select or adjust a horizontal scanning resolution by changing a rate of rotation of device 100 (and/or transmitter 106 and receiver 114). Additionally or alternatively, the horizontal scanning resolution can be modified by adjusting a pulse rate of signals emitted by transmitter 106. In a first example, transmitter 106 may be configured to emit pulses at a pulse rate of 15,650 pulses per second, and to rotate at 10 Hz (i.e., ten complete 360° rotations per second) while emitting the pulses. In this example, receiver 114 may have a 0.23° horizontal angular resolution (e.g., horizontal angular separation between consecutive pulses). In a second example, if device 100 is instead rotated at 20 Hz while maintaining the pulse rate of 15,650 pulses per second, then the horizontal angular resolution may become 0.46°. In a third example, if transmitter 106 emits the pulses at a rate of 31,300 pulses per second while maintaining the rate of rotation of 10 Hz, then the horizontal angular resolution may become 0.115°. In some examples, device 100 can be alternatively configured to scan a particular range of views within less than a complete 360° rotation of device 100. Other implementations are possible as well.

It is noted that the pulse rates, angular resolutions, rates of rotation, and viewing ranges described above are only for the sake of example, and thus each of these scanning characteristics could vary according to various applications of device 100.

Rotating platform 116 may be configured to rotate about an axis. To that end, rotating platform 116 can be formed from any solid material suitable for supporting one or more components mounted thereon. For example, transmitter 106 and receiver 114 may be arranged on rotating platform 116 such that each of these components moves relative to the environment based on rotation of rotating platform 116. In particular, these components could be rotated about an axis so that device 100 may obtain information from various directions. In this manner, a pointing direction of device 100 can be adjusted horizontally by actuating the rotating platform 114 to adjust a FOV of device 100 in various directions.

In order to rotate platform 116 in this manner, one or more actuators 118 may actuate the rotating platform 114. To that end, actuators 118 may include motors, pneumatic actuators, hydraulic pistons, and/or piezoelectric actuators, among other possibilities.

With this arrangement, controller 104 could operate actuator 118 to rotate rotating platform 116 in various ways so as to obtain information about the environment. In one example, rotating platform 116 could be rotated in either direction. In another example, rotating platform 116 may carry out complete revolutions such that device 100 scans a 360° view of the environment. Moreover, rotating platform 116 could rotate at various frequencies so as to cause device 100 to scan the environment at various refresh rates. In one embodiment, device 100 may be configured to have a refresh rate of 10 Hz (e.g., ten complete rotations of device 100 per second). Other refresh rates are possible.

Alternatively or additionally, device 100 may be configured to adjust the pointing direction of an emitted signal (emitted by transmitter 106) in various ways. In one implementation, signal emitters (e.g., light sources, antennas, acoustic transducers, etc.) of transmitter 106 can be operated according to a phased array configuration or other type of beam steering configuration.

In a first example, where device 100 is configured as a LIDAR device, light sources or emitters in transmitter 106 can be coupled to phased array optics that control the phase of light waves emitted by the light sources. For instance, controller 104 can be configured to adjust the phased array optics (e.g., phased array beam steering) to change the effective pointing direction of a light signal emitted by transmitter 106 (e.g., even if rotating platform 116 is not rotating).

In a second example, where device 100 is configured as a RADAR device, transmitter 106 may include an array of antennas, and controller 104 can provide respective phase-shifted control signals for each individual antenna in the array to modify a pointing direction of a combined RF signal from the array (e.g., phased array beam steering).

In a third example, where device 100 is configured as a SONAR device, transmitter 106 may include an array of acoustic transducers, and controller 104 can similarly operate the array of acoustic transducers (e.g., via phase-shifted control signals, phased array beam steering, etc.) to achieve a target pointing direction of a combined sound signal emitted by the array (e.g., even if rotating platform 116 is not rotating, etc.).

Stationary platform 120 may take on any shape or form and may be configured for coupling to various structures, such as to a top of a vehicle, a robotic platform, assembly line machine, or any other system that employs device 100 to scan its surrounding environment, for example. Also, the coupling of the stationary platform may be carried out via any feasible connector arrangement (e.g., bolts, screws, etc.).

Rotary link 122 directly or indirectly couples stationary platform 120 to rotating platform 116. To that end, rotary link 122 may take on any shape, form and material that provides for rotation of rotating platform 116 about an axis relative to the stationary platform 120. For instance, rotary link 122 may take the form of a shaft or the like that rotates based on actuation from actuator 118, thereby transferring mechanical forces from actuator 118 to rotating platform 116. In one implementation, rotary link 122 may have a central cavity in which one or more components of device 100 may be disposed. In some examples, rotary link 122 may also provide a communication link for transferring data and/or instructions between stationary platform 120 and rotating platform 116 (and/or components thereon such as transmitter 106 and receiver 114).

Housing 124 may take on any shape, form, and material and may be configured to house one or more components of device 100. In one example, housing 124 can be a dome-shaped housing. Further, in some examples, housing 124 may be composed of a material that is at least partially non-transparent, which may allow for blocking of at least some signals from entering the interior space of the housing 124 and thus help mitigate thermal and noise effects of ambient signals on one or more components of device 100. Other configurations of housing 124 are possible as well.

In some examples, housing 124 may be coupled to rotating platform 116 such that housing 124 is configured to rotate based on rotation of rotating platform 116. In these examples, transmitter 106, receiver 114, and possibly other components of device 100 may each be disposed within housing 124. In this manner, transmitter 106 and receiver 114 may rotate along with housing 124 while being disposed within housing 124. In other examples, housing 124 may be coupled to stationary platform 120 or other structure such that housing 124 does not rotate with the other components rotated by rotating platform 116.

It is noted that this arrangement of device 100 is described for exemplary purposes only and is not meant to be limiting. As noted above, in some examples, device 100 can be alternatively implemented with fewer components than those shown. In one example, device 100 can be implemented without rotating platform 100. For instance, transmitter 106 can be configured to transmit a plurality of signals spatially arranged to define a particular FOV of device 100 (e.g., horizontally and vertically) without necessarily rotating transmitter 106 and receiver 114. Other examples are possible as well.

Figure 2:
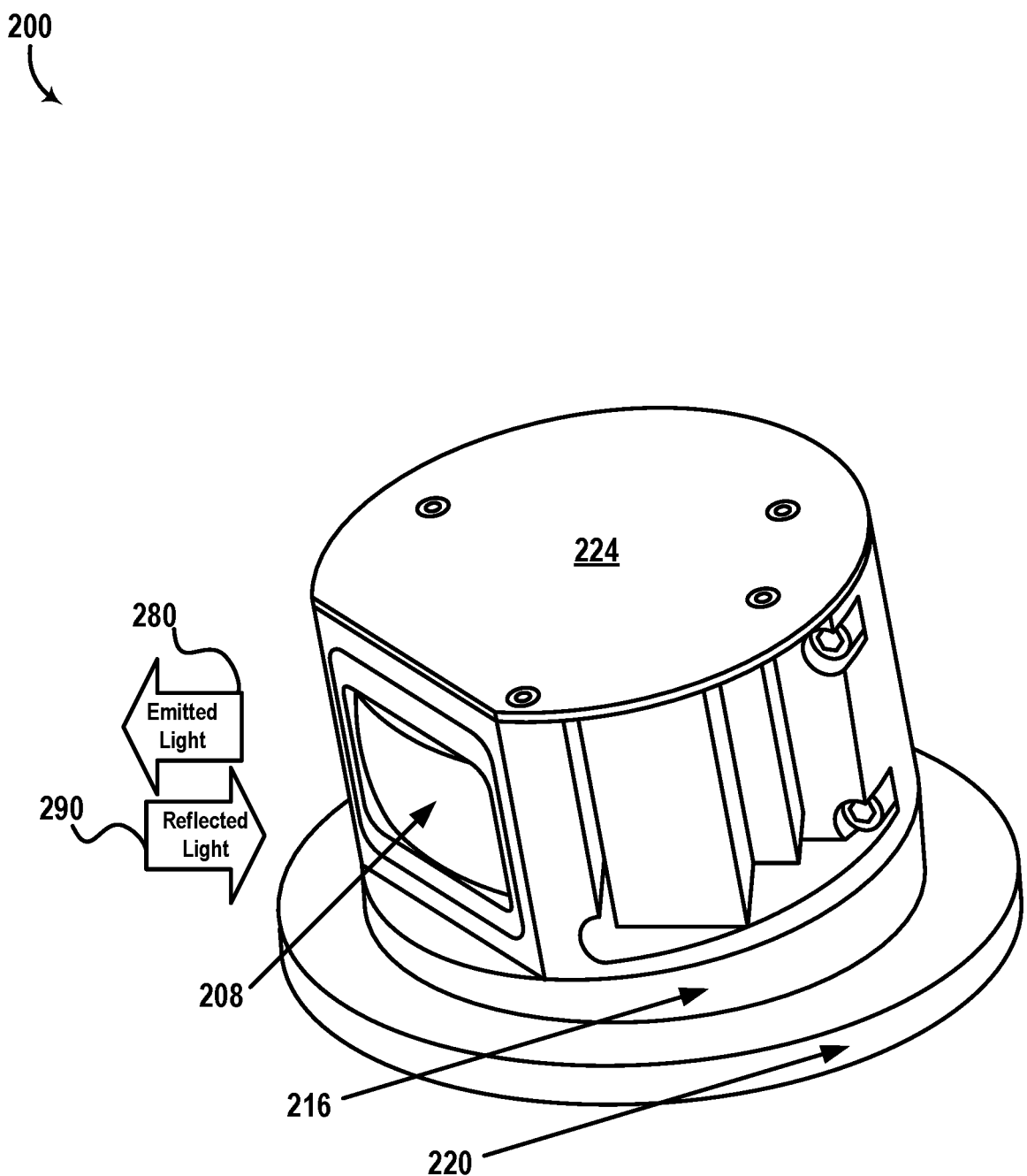
FIG. 2 illustrates a LIDAR device, according to example embodiments.

FIG. 2 illustrates a LIDAR device 200, according to an example embodiment. In some examples, LIDAR 200 may be similar to device 100. For example, as shown, LIDAR device 200 includes a lens 208, a rotating platform 216, a stationary platform 220, and a housing 224 which may be similar, respectively, to optical element 108, rotating platform 216, stationary platform 120, and housing 124. In the scenario shown, light beams 280 emitted by LIDAR device 200 may propagate from lens 108 along a viewing (or pointing) direction of LIDAR 200 toward a FOV of LIDAR 200, and may then reflect off one or more objects in the environment as reflected light 290.

In some examples, housing 224 can be configured to have a substantially cylindrical shape and to rotate about an axis of LIDAR device 200. In one example, housing 224 can have a diameter of approximately 10 centimeters. Other examples are possible. In some examples, the axis of rotation of LIDAR device 200 is substantially vertical. For instance, a three-dimensional map of a 360-degree view of the environment of LIDAR device 200 can be determined by rotating housing 224 about a vertical axis. Additionally or alternatively, in some examples, LIDAR device 200 can be configured to tilt the axis of rotation of housing 224 to control a field of view of LIDAR device 200. Thus, in some examples, rotating platform 216 may comprise a movable platform that may tilt in one or more directions to change the axis of rotation of LIDAR device 200.

In some examples, lens 208 can have an optical power to both collimate (and/or direct) emitted light beams 280 toward the environment of device 200, and to focus reflected light 290 from one or more objects in the environment of LIDAR device 200 onto detectors in LIDAR device 200. In one example, lens 208 has a focal length of approximately 120 mm. Other examples are possible. By using the same lens 208 to perform both of these functions, instead of a transmit lens for collimating and a receive lens for focusing, advantages with respect to size, cost, and/or complexity can be provided.

In other examples, instead of the single lens 208 configuration as shown in FIG. 2, LIDAR 200 could be alternatively implemented to include separate transmit lens (for manipulating emitted light 280) and receive lens (for focusing reflected light 290).

Figure 3:
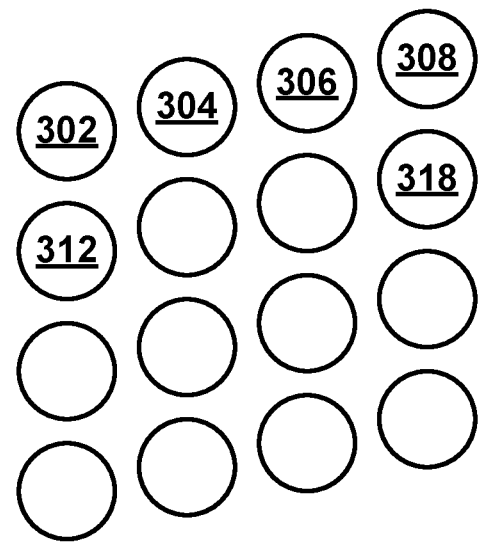
FIG. 3 illustrates a cross-section view of a plurality of emitted beams spatially arranged to scan respective portions of a FOV, according to example embodiments.

FIG. 3 illustrates a cross-section view of a plurality of emitted beams, exemplified by beams 302, 304, 306, 308, 312, 318, that are spatially arranged to scan respective portions of a FOV 300, according to example embodiments.

FOV 300 may correspond to a FOV that is illuminated by transmitter(s)/emitter(s) (e.g., transmitter 106, emitter(s) 140, etc.) of an active sensor (e.g., devices 100, 200) during a scan of the FOV.

For example, referring back to FIG. 2, FOV 300 may correspond to the region of the environment of device 200 toward which light beams 280 are emitted. In this example, the beams shown in FIG. 3 may be propagating through the page in the direction of the arrow 280 shown in FIG. 2.

In some examples, a device or system herein may transmit the plurality of beams 302, 304, 306, 308, 312, 318, etc., in a relative spatial arrangement such as the arrangement shown in FIG. 3, during an emission time period of a particular scan of FOV 300. Thus, as shown, each of the emitted beams may scan a respective portion of FOV 300. For example, beam 302 may have a particular (elevational and azimuthal) angular position within the spatial arrangement of the plurality of beams shown. In a LIDAR device configuration for instance, the particular angular position of beam 302 may be defined by one or more optical elements (e.g., lenses, apertures, waveguides, etc.) that direct beam 302 in a particular transmit path. Thus, for instance, the various respective portions of FOV 300 scanned by the emitted beams may together define the vertical and horizontal extents of FOV 300 that are scanned by multiple channels of an active sensor.

In some examples, where a device performs a sequence of scans of FOV 300, the device can then perform a second scan of FOV 300 by transmitting a second plurality of beams, in a similar spatial arrangement as that shown for the beams of FIG. 3, to scan the respective portions of FOV 300 another time, and so on.

In some examples, a device herein may include a plurality of emitters (e.g., emitters 140) that emit the plurality of beams shown in FIG. 3. A first emitter of the plurality may emit signals toward a first portion of FOV 300, and a second emitter may emit light that illuminates a second portion of FOV 300. In a first example, the first emitter may be coupled to optical elements (e.g., waveguide(s), aperture(s), lens(es), etc.) that direct its emitted light to the angular position of beam 302 in the spatial arrangement of the emitted beams. Similarly, in this example, signals emitted by the second emitter may be directed to the angular position of 312, and so on. In a second example, the signals from each emitter may be split into multiple beams. For instance, signals from the first emitter can be split into the row of beams including beams 302, 304, 306, 308. Similarly, for instance, signals from the second emitter may be split to provide the row of four beams including beams 312 and 318. Other examples are possible.

In some examples, a device herein may include a plurality of detectors for receiving reflected signals (e.g., light) from respective portions of FOV 300 illuminated by beams 302, 304, 306, 308, 312, 318, etc. Referring back to FIG. 2 for example, lens 208 may be configured to focus received light 290 for receipt by a plurality of detectors (e.g., detectors 110 of device 100). Moreover, referring back to FIG. 1, a first detector of detectors 110 can be arranged to receive a first portion of the focused light that includes a reflection of beam 302, a second detector of detectors 110 can be arranged to receive a second portion of the focused light that includes a reflection of beam 304, and so on.

It is noted that the arrangement, shapes, and/or number of the plurality of emitted beams shown in FIG. 3 may vary, and are only illustrated as shown for convenience in description. For example, FOV 300 could be scanned by an example device herein that emits more or fewer beams for scanning various respective portions of FOV 300. As another example, the beams can be arranged in a different spatial arrangement (e.g., circular arrangement, linear arrangement, grid arrangement, etc.) than the arrangement shown in FIG. 3.

III. EXAMPLE METHODS

Figure 4:
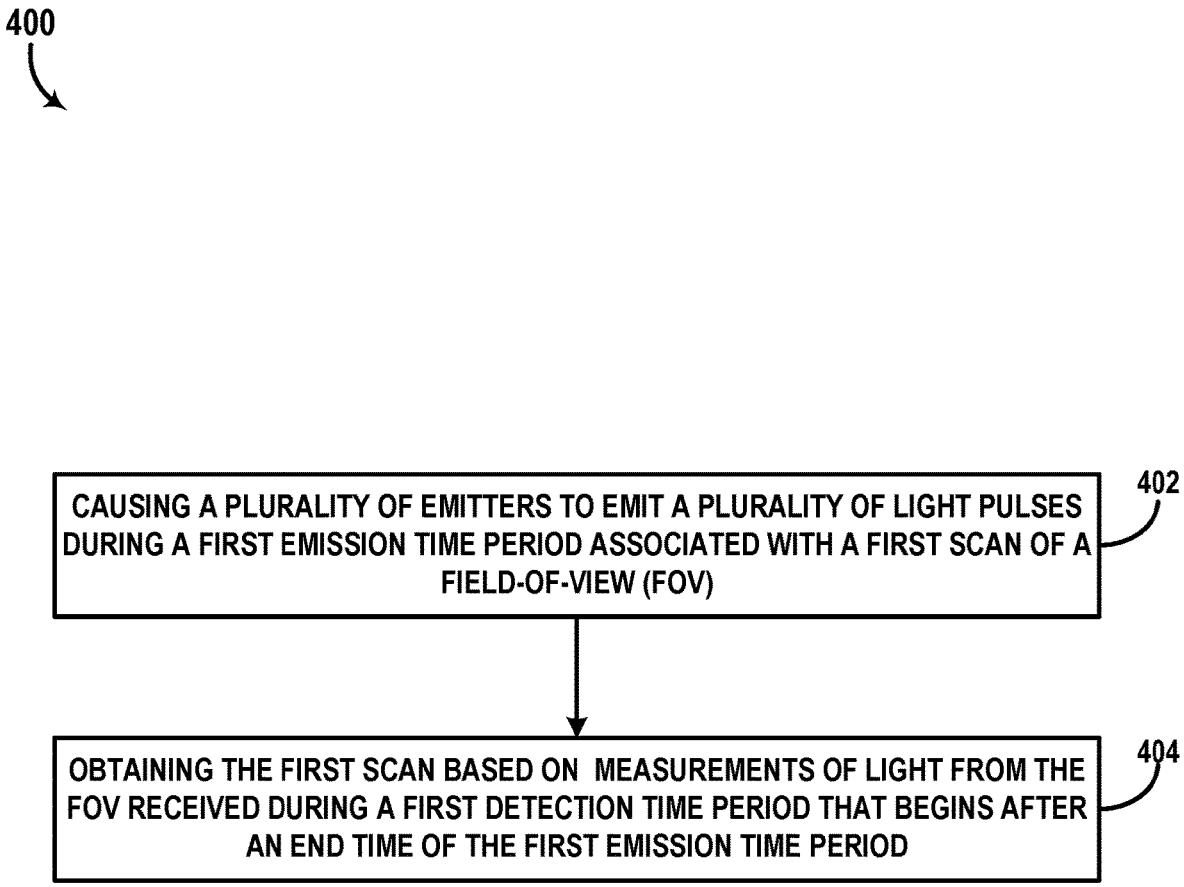
FIG. 4 is a flowchart of a method, according to example embodiments.

FIG. 4 is a flowchart of a method 400, according to example embodiments. Method 400 presents an embodiment of a method that could be used with any of devices 100 and/or 200, for example. Method 400 may include one or more operations, functions, or actions as illustrated by one or more of blocks 402-404. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 400 and other processes and methods disclosed herein, each block in FIG. 4 may represent circuitry that is wired to perform the specific logical functions in the process.

At block 402, method 400 involves causing a plurality of emitters to emit a plurality of light pulses during a first emission time period associated with a first scan of a field-of-view (FOV). The plurality of emitters may include at least a first emitter and a second emitter. The first emitter may be configured to illuminate a first portion of the FOV, and the second emitter may be configured to illuminate a second portion of the FOV.

Referring back to FIG. 3 for example, a first emitter (e.g., one of emitters 140 of device 100, etc.) may emit light that includes a first row of light beams 302, 304, 306, 308 to scan a first portion of FOV 300 illuminated by the first row. Further, a second emitter (e.g., another one of emitters 140, etc.) may emit light that includes a second row of light beams (e.g., including beams 312, 318 and the two beams in between) to scan a second portion of FOV 300 illuminated by the second row, and so on.

In some implementations, method 400 involves obtaining the first scan of the FOV, where obtaining the first scan involves causing each emitter of the plurality of emitters to emit a respective light pulse during the first emission time period. For example, the first emission time period may have a start time (e.g., t=0 ns) and an end time (e.g., t=499 ns), and each emitter of the plurality of emitters may be coupled to a respective pulser circuit (e.g., controller 140) that triggers emission of a respective light pulse by the emitter during a time offset between the start time and end time of the first emission time period. In one embodiment, a first pulser circuit can be configured to trigger pulse emissions by two or more particular emitters of the plurality of emitters. For instance, the two or more emitters may be configured to emit respective light pulses at a same time offset within the first emission time period. In another embodiment, the first pulser circuit can be configured to trigger pulse emissions by one emitter and a second pulser circuit can be configured to trigger emissions by another emitter.

Thus, in some implementations, method 400 involves causing a first emitter (of the plurality of emitters) to emit a first-emitter light pulse at a first-emitter time offset from the start time (or the end time) of the first emission time period, and causing a second emitter to emit a second-emitter light pulse at a second-emitter time offset from the start time (or the end time) of the first emission time period. In an example scenario, where the first emission time period extends from t=0 ns to t=499 ns, the first emitter can be configured to emit a light pulse at the first-emitter time offset of 0 ns from the start time (i.e., at t=0 ns) or from the end time (i.e., at t=499 ns) of the first emission time period. Similarly, in this scenario, the second emitter may emit a light pulse at the second-emitter time offset of 10 ns from the start time (i.e., at t=10 ns) or from the end time (i.e., at t=489 ns).

In some examples, the first-emitter light pulse (and/or the second-emitter light pulse) can be split into multiple light beams of multiple channels scanned by a system of method 400. Referring back to FIG. 3 for example, light from a single emitter (e.g., LED, etc.) may be split (e.g., using mirrors, waveguides, beam splitters, etc.) into four light beams 302, 304, 306, 308 to scan four separate portions of FOV 300. Alternatively or additionally, in some examples, the first-emitter light pulse (and/or the second-emitter light pulse) can be transmitted as a single respective light beam toward the FOV. Referring back to FIG. 3 for example, beam 302 can be emitted by the first emitter, beam 304 can be emitted the second emitter, and so on. Other examples are possible.

In some examples, a difference between the first-emitter time offset and the second-emitter time offset may be at least 2.5 nanoseconds (or another predetermined threshold). Referring back to FIG. 3 for example, an emission time of beam 302 can be separated from an emission time of beam 304 (and/or any other beam) by at least a threshold amount of time (e.g., 2.5 nanoseconds). In some examples, the emitter-specific time offsets assigned to each of the plurality of emitters can be separated by multiples of the predetermined threshold (e.g., the first emitter can be assigned a first-emitter time offset value of 1*2.5=2.5 ns, the second emitter can be assigned a second-emitter time offset value of 10*2.5=25 ns, etc.).

At block 404, method 400 involves obtaining the first scan based on measurements of light from the FOV received during a first detection time period that begins after (or at) the end time of the first emission time period.

In an example scenario, the first emission time period may extend from a start time of t=0 ns to an end time of t=499 ns. In this scenario, the first detection time period may begin after the end time (e.g., at t=500 ns) or at the end time (i.e., at t=499 ns) of the first emission time period. Referring back to FIG. 3 for instance, a system of method 400 may transmit light beams 302, 304, 306, 308 at respective time offsets (e.g., at t=0 ns, t=100 ns, t=200 ns, and t=400 ns) within the first emission time period. Further, the system may then obtain the first measurement of light incident on detectors 110 (shown in FIG. 1) during the first detection time period (e.g., from t=500 ns to t=2500 ns). Thus, in some examples, the measurements of light from the FOV at block 404 may include one or more measurements of incident light associated with one or more channels that illuminate one or more respective portions of the FOV. For example, the measurements of the light from the FOV can be obtained by a plurality of detectors (e.g., detectors 110), where each detector of the plurality is aligned with a respective portion of the FOV illuminated by a respective light pulse of the plurality of light pulses.

In some implementations, method 400 involves obtaining a sequence of scans of the FOV including at least the first scan and a second scan subsequent to the first scan. For instance, consider a scenario where the first scan has a first emission time period from a start time of t=0 ns to an end time of t=499 ns, and a first detection time period from t=500 ns to t=2500 ns. In this scenario, the second scan may have a second emission time period that begins at a start time of t=5000 ns and ends at an end time of t=5499 ns, and a second detection time period from t=5500 ns to t=7500 ns. In this scenario, a device of method 400 may be configured to obtain a scan of the FOV every 5000 ns. Referring back to FIG. 3 for instance, the device may be configured to emit all of the plurality of beams shown to illuminate FOV 300 during the first emission time period, and then a second similar plurality of beams during the second emission time period.

In some implementations, method 400 involves illuminating the first portion of the FOV using the first emitter during the first scan, and illuminating a different portion of the FOV using the first emitter during the second scan. Referring back to FIG. 1 for example, transmitter 106 (and/or optical element 108) can be configured to adjust the source (e.g., emitter A of emitters 140, emitter B of emitters 140, etc.) of light beams 302, 304, 306, 308, 312, 318, etc. For instance, device 100 may include mirrors, switches, actuators, and/or any other type of circuitry to allow controlling which portions of the scanned FOV are illuminated by which emitter during a particular scan. In this example, during the first scan, beam 302 could be emitted by the first emitter to illuminate the first portion of FOV 300. In this example, during the second scan, beam 304 could be emitted by the first emitter instead of beam 302 to illuminate a different portion of the FOV, and so on. Similarly, the scanning channel(s) illuminated by the second emitter (and/or any other emitter of the plurality of emitters) can be changed between successive scans of the FOV.

Thus, in these implementations, a mapping between emitters and scanning channels can be varied to dither the relative emission times of pulses during consecutive scans of the FOV. By way of example, referring back to FIG. 3, pulse 302 during the first scan can be emitted by the first emitter at the first-emitter time offset from the start time (or end time) of the first emission time period, then another pulse 302 can be emitted by the second emitter at the second-emitter time offset from the start time (or end time) of the second emission time period, and so on.

Alternatively or additionally, in some implementations, method 400 may involve modifying the first-emitter time offset for the second scan. In these implementations, obtaining the second scan described above may comprise causing the first emitter to emit another first-emitter light pulse at the modified first-emitter time offset (from a start time or end time) of the second emission time period associated with the second scan. In the scenario above for instance, a first-emitter time offset of 0 ns may be used for the first emitter during the first scan (e.g., first-emitter light pulse emitted at t=0 ns if the first-emitter offset is from the start time, or at t=499 ns if the first-emitter offset is from the end time). Further, in this scenario, the first-emitter time offset may then be adjusted to 50 ns for the second scan. For instance, another first-emitter light pulse emitted during the second scan may be emitted at t=5000+50=5050 ns (offset from start time of second emission time period), or at t=5500−50=5450 ns (offset from end time of second emission time period. Further, in some examples, similarly to the first scan, obtaining the second scan may be based on measurements of light from the FOV received by the plurality of detectors (e.g., detectors 110) during the second detection time period that begins after (or at) the end time of the second emission time period.

In some implementations, method 400 may also involve modifying the second-emitter time offset for the second scan. In these implementations, obtaining the second scan may also involve causing the second emitter to emit another second-emitter light pulse at the modified second-emitter time offset from the start time (or the end time) of the second emission time period. For instance, similarly to the discussion above for the modification of the first-emitter time offset, the second-emitter offset can be adjusted for each successive scan in the sequence.

In some implementations, method 400 involves determining a pseudo-random time offset sequence. For example, controller 104 (or another external computing system) can be configured to generate a sequence of time offsets within a typical emission period (e.g., between 0 and 499 ns, etc.) for a certain number of scans of the FOV by a particular emitter (e.g., 50 offsets for 50 pulse emissions by a first emitter during 50 consecutive scan periods, etc.) of emitters 140. In some examples, the sequence of pseudo-random time offsets may be computed as random time offset values within a particular range (e.g., 0 to 499 ns, etc.). Additionally or alternatively, in some examples, the values of the time offsets in the sequence can be selected from the particular range according to one or more rules (e.g., to constrain the extent of their randomness).

In a first example, the time offsets in the sequence can be selected to be non-repeatable. For instance, the first emitter can be assigned a specific number (e.g., 50, 60, etc.) of unique time offset values for the same number (e.g., 50, 60, etc.) of consecutive scans of the FOV (i.e., the sequence of scans). Accordingly, in some implementations, determining the pseudo-random time offset sequence may comprise determining a sequence of time offset values that are different from one another. With this arrangement for instance, a system of method 400 can prevent (or reduce the likelihood of) the first emitter being assigned the same time offset value randomly (at least for a particular number of consecutive scans).

In a second example, the time offsets in the sequence can be selected to be different from corresponding time offsets assigned to other emitters of the LIDAR device during a same scan of the FOV. For instance, a computing device of method 400 may pre-compute a plurality of pseudo-random time offset sequences for use with the plurality of emitters during the sequence of scans. The respective time offset values ordered at a same position in each sequence can be selected to be different from one another. For instance, consider a scenario where a first time offset sequence is generated to include the time offsets of 0 ns, 100 ns, 50 ns (in that order). In this scenario, every other sequence may be generated to include a first time offset different than 0 ns, a second time offset different than 100 ns, a third time offset different than 50 ns, and so on. Thus, in this example, a system of method 400 can provide a different time offset value for each emitter of the LIDAR device during any particular scan of the sequence of scans by assigning the first pseudo-random time offset sequence to the first emitter, a second pseudo-random time offset sequence to the second emitter, and so on.

Accordingly, in some implementations, method 400 may involve determining a plurality of pseudo-random time offset sequences for the plurality of emitters. In these implementations, a given time offset of a given sequence may have a different value than corresponding time offsets having a same order-position in other sequences of the plurality of pseudo-random time offset sequences.

Due to the varying of the relative emission times of the plurality of emitters within the respective emission time periods of the sequence of scans, a spurious signal received at a first detector aligned with a first emitter (e.g., reflection of a light beam that was not emitted by the first emitter) may correspond to a different distance in each successive scan of the sequence (e.g., incoherent detections of the spurious signal by the first detector). However, because the respective detection time period of each scan begins after the respective emission time period of the scan ends, a minimum range measured by each detector may also vary in each scan of the sequence.

For example, consider a scenario where the first emission time period of the first scan is between t=0 ns and t=500 ns, the first detection time period of the first scan is between t=500 ns and t=2500 ns, the second emission time period of the second scan is between t=5000 ns and t=5500 ns, and the second detection time period of the second scan is between t=5500 ns and t=7500 ns. In this scenario, the first emitter may emit a first-emitter light pulse in the first scan at t=500 ns (i.e., first-emitter time offset is 0 ns from the end time of the first emission time period). Thus, during the first scan, the first detector aligned with the first emitter may begin detecting reflections of the first-emitter light pulse as soon as it is emitted (i.e., at t=500 ns), and may thus detect an object that is 0 meters away from a LIDAR device of method 400. In this scenario, during the second scan of the FOV, the first-emitter time offset may be modified to 500 ns (e.g., another first-emitter light pulse is emitted 500 ns prior to the end time of the second emission time period or at t=5500−500=5000 ns). Thus, in the second scan, reflections of the (another) first-emitter light pulse that arrive at the LIDAR device within 500 ns (i.e., between t=5000 ns and t=5500 ns) after the first-emitter light pulse is emitted might not be detected by the first detector aligned with the first emitter. More specifically, in this scenario, reflections off objects that are 75 meters or less from the LIDAR device might not be detected by the first detector because they would arrive before the second detection time period of the second scan begins (i.e., before t=5500 ns).

Accordingly, in some examples, the randomness of the pseudo-random time offset sequence can be constrained to achieve a minimum scanning range by the first emitter at least once within a particular number of consecutive scans. For instance, the pseudo-random time offset sequence may be constrained such that every 10 successive time offsets in the pseudo-random time offset sequence includes at least one time offset of 0 ns (e.g., from the end time of the respective emission time period of the scan). With this arrangement, a particular channel of the LIDAR device a may be configured to scan objects near the LIDAR device at least once in every 10 scans in the sequence of scans. By way of an example scenario, referring back to FIG. 3, a channel that scans the portion of FOV 300 illuminated by beam 302 may emit ten successive beams/pulses similar to beam 302 during ten successive scans of FOV 300 according to the pseudo-random time sequence. For this scenario, in at least one of the ten scans, the respective emitted beam may be triggered at the end of the respective emission time period of the at least one scan to ensure the portion of the FOV scanned by that channel can detect objects at a 0 meter range at least once during the ten successive scans.

Similarly, in some examples, the randomness of the pseudo-random time offset sequence can be constrained to achieve multiple minimum scanning ranges using the first emitter during the sequence of scans. For example, the time offset sequence may be generated to include at least one time offset for a 0 meter minimum range, at least one time offset for a 10 meter minimum range, at least one offset for a 20 meter minimum range, and so on.

Thus, in some implementations, determining the pseudo-random time offset sequence may involve determining at least one time offset that is less than or equal to a predetermined threshold offset (e.g., <=0 ns, <=50 ns, etc.). Additionally or alternatively, determining the pseudo-random time offset sequence may involve determining at least one time offset that is within a threshold predetermined threshold range (e.g., between 95 ns and 105 ns, etc.).

In some implementations, method 400 may involve selecting the first-emitter time offset for each scan of the sequence of scans from the pseudo-random time offset sequence based on an order of the scan in the sequence of scans. For example, a first time offset may be selected from the pseudo-random time offset sequence for a first scan of the sequence of scans, a second time offset subsequent to the first offset in the pseudo-random time offset sequence may be selected for a second scan subsequent to the first scan in the sequence of scans, and so on.

In some examples, determining the pseudo-random time offset sequence may involve obtaining a predetermined pseudo-random time offset sequence. For instance, the time offset sequences may be precomputed (e.g., by a controller of the LIDAR device, or by another external computing system) and/or retrieved from data storage prior to obtaining a scan of the environment. In other examples however, determining the pseudo-random time offset sequence may alternatively involve generating the pseudo-random time offset sequence at any other time (e.g., between scans, during scans, etc.).

In some implementations, method 400 involves obtaining a first sequence of scans (e.g., 50 scans) and a second sequence of scans (e.g., 50 additional scans) subsequent to the first sequence of scans. In these implementations, method 400 may also involve adjusting the second-emitter time offset for one or more of the second sequence of scans according to the determined pseudo-random time offset sequence. For example, in line with the discussion above, the pseudo-random time offset sequence may be used to adjust the respective first-emitter time offsets assigned to the first emitter during the first sequence of scans. Then, during the second sequence of scans, the same pseudo-random time offset sequence can be re-used to instead modify the respective second-emitter time offsets assigned to the second emitter during the second sequence of scans. By doing so for instance, additional randomization of the light pulse emissions by the channels can be achieved as compared to implementations where the same pseudo-random offset sequence for every sequence of scans by a particular channel.

Referring back to FIG. 3 for example, a first emitter that illuminates the portion of FOV 300 illuminated by the row of beams 302, 304, 306, 308 can be assigned a particular pseudo-random time offset sequence for a first sequence of N scans. Then, during a subsequent sequence of N additional scans, a different portion of the FOV illuminated by the row of beams 312, 318 (and the three other beams in between) can be assigned the particular pseudo-random time offset sequence (which was previously used with the first emitter), and so on.

In other implementations however, a same pseudo-random time offset sequence can be alternatively re-used with the first emitter during both the first sequence of scans and the second subsequent sequence of scans.

In some implementations, method 400 may involve illuminating a first portion of the FOV using the first emitter during the first sequence of scans, and illuminating a second portion of the FOV using the first emitter during the second sequence of scans subsequent to the first sequence of scans. Thus, referring now to FIG. 3 for example, the first emitter can be configured to illuminate the portions of FOV 300 corresponding to beams 302 and 304 during a first sequence of scans (e.g., 50 scans), and then the first emitter can be configured to illuminate the portion of the FOV corresponding to beams 308 and 318 during a second subsequent sequence of scans (e.g., the next 50 scans), and so on. With this arrangement for instance, even if a same pseudo-random time offset sequence is re-used with the first emitter during consecutive sequences of scans, a particular channel (e.g., portion of FOV associated with beam 302) may effectively be scanned according to a different pseudo-random time offset sequence of the second emitter during the second sequence of scans.

In some implementations, method 400 involves determining, based on the first measurement of block 404, respective distances between a device of method 400 and objects in the FOV illuminated by the plurality of beams. For instance, in an implementation where device 100 illuminates FOV 300, controller 104 may be configured to compute a time difference between an emission time of beam 302 (shown in FIG. 3) and a detection time of a reflection of beam 302 (e.g., by receiver 114), and then compute the distance between device 100 and an object within the portion of the FOV illuminated by beam 302 based on the time difference.

In some implementations, method 400 involves determining that a likelihood of false signal detections by one or more detectors of the LIDAR device is greater than a threshold based on signal characteristics of a first signal received by a first detector of the LIDAR device. For example, controller 104 may receive a measurement of the first signal from the first detector, and then determine that the first signal has a signal intensity outside a given range (e.g., greater than an expected intensity, a threshold high intensity expected when a retroreflector is illuminated by an emitter of the plurality of emitters, etc.). In this example, the one or more detectors (e.g., of other transmit/receive channels) may detect false (e.g., spurious) signals due to portions of the light associated with the first signal having sufficient power to be also detected (spuriously) by the one or more detectors. Further, in this example, the spurious signals at the one or more channels may be received at substantially the same time when the first signal was received at the first channel.

Accordingly, in some implementations, method 400 may also involve storing an indication of a time of receipt of the first signal. For instance, a computing device (e.g., controller 104, external computer, etc.) that processes LIDAR data from the LIDAR device may access the stored indication to identify the one or more signals detected by other detectors at (substantially) the same time when the first signal was also detected by the first detector. In this instance, the computing device may then remove the one or more signals (e.g., if they are deemed to correspond to spurious detections) from the LIDAR data, or keep the one or more signals (e.g., if they are deemed to correspond to true detections).

Accordingly, in some implementations, method 400 may also involve identifying one or more error signals detected by one or more detectors of the LIDAR device based on signal characteristics of a given signal detected by a given detector other than the one or more detectors. Further, in some implementations, the identification of the one or more error signals may be based on a comparison of detection times of the one or more error signals and a detection time of the given signal.

In some examples, the portion of the FOV scanned by a particular LIDAR channel during a sequence of scans may correspond to different physical regions in the environment of the LIDAR device. Referring back to FIG. 2 for example, LIDAR 200 may be configured to rotate about an axis (e.g., vertical axis, etc.) while obtaining the sequence of scans of the environment. In this example, the portion of the FOV scanned by a first channel of LIDAR 200 (e.g., a portion of the FOV illuminated by the first emitter of method 400 and observed by the first detector of method 400, etc.) during a first scan (when LIDAR 200 is at a first angular position about its axis of rotation) may correspond to a different physical region in the environment of LIDAR 200 than the region scanned by the first channel during a second scan (e.g., performed after LIDAR 200 rotates to a second angular position about the axis). Referring back to FIG. 3 for example, beam 302 may point toward a first angular direction (relative to the axis of rotation of the LIDAR) during the first scan, and toward a second angular direction during the second scan. In a scenario where the LIDAR rotates in a counterclockwise direction after the first scan for instance, beam 302 may move to the left of its position shown in FIG. 3.

In some scenarios, where the LIDAR is rotating and the first channel illuminates a retroreflector in the environment for instance, varying the respective emitter time offsets during the respective emission time periods of the sequence of scans in accordance with method 400 could still result in incoherent distance measurements indicated by spurious signals received in a second channel due to the retroreflector illuminated by the first channel. For instance, the retroreflector (e.g., street sign) may have a sufficient spatial extent such that multiple light pulses emitted by the first channel (in the sequence of scans) while the LIDAR is rotating would still reflect off portions of the retroreflector (and therefore cause a sequence of spurious detections in the second channel). Thus, the present method may facilitate identification of spurious signal detections (e.g., due to channel cross-talk, presence of retroreflectors, etc.) even in some scenarios where the LIDAR is moving (e.g., rotating, etc.) while obtaining the sequence of scans.

As noted above, in some examples, a device or system of method 400 may include a plurality of detectors (e.g., detectors 110) arranged to receive light from respective portions of the FOV illuminated by the plurality of emitters. For example, a first detector of the plurality of detectors can be arranged (e.g., aligned, etc.) to receive light from the first portion of the FOV illuminated by the first emitter. For instance, the first detector can be positioned at a location where a lens or other optical element assembly (e.g., optical elements 108) focuses light from the first portion of the FOV toward the first detector.

To that end, in some implementations, method 400 may also involve detecting, via the first detector, a first-detector light pulse at a first detection time during the first detection time period, and associating the first-detector light pulse with presence of a retroreflector in the first portion of the FOV illuminated by the first emitter. In line with the discussion above, for instance, the first-detector light pulse may have a larger than expected amount of energy, or may be received at a same time one or more other light pulses detected by one or more other detectors, among other possibilities.

Thus, in one implementation, associating the first-detector light pulse with presence of the retroreflector is based on at least an intensity of the first-detector light pulse being greater than a threshold intensity. For instance, retroreflectors may have a relatively larger effective reflectivity than other types of reflectors. Thus, in this instance, if the intensity of the detected light pulse is more than an expected intensity of light from a regular reflector, then the device of method 400 may determine that the detected light pulse was reflected by a retroreflector. To that end, the threshold intensity may be selected depending on a variety of factors, such as the configuration and/or application of the device that performs method 400 (e.g., 50% of the peak intensity of the first-emitter light pulse or any other predetermined value), for example.

Alternatively or additionally, in this implementation, method 400 may involve determining the threshold intensity based on the first-emitter time offset and the first detection time. For example, the threshold intensity can be adjusted depending on the difference between a first emission time of the first-emitter light pulse and the first detection time. For instance, if the detected light pulse was reflected by a far object (i.e., difference between the first emission time and the first detection time is relatively large), then the threshold intensity can be reduced because the expected intensity of a reflection from the far object is lower than if the detected light pulse was reflected by a nearer object (i.e., where the difference between the first emission time and the first detection time is relatively lower).

In some implementations, method 400 may also involve detecting, via a second detector, a second-detector light pulse at a second detection time during the first detection time period of the first scan. For example, the second detector may be arranged to measure light from the second portion of the FOV illuminated by the second emitter. Thus, in this example, a device of method 400 may compare the first detection time to the second detection time as a basis for determining presence of a retroreflector. For instance, based on the comparison, the device may determine whether the detection of the second-detector light pulse by the second detector was caused by: (i) the presence of a retroreflector in the first portion of the FOV illuminated by the first emitter, (ii) or the presence of an object (e.g., regular reflector) in the second portion of the FOV illuminated by the second emitter.

Accordingly, in a first implementation, method 400 may involve associating the second-detector light pulse with the presence of the retroreflector in the first portion of the FOV based on at least the first detection time being within a predetermined threshold to the second detection time. In a second implementation, method 400 may involve associating the second-detector light pulse with presence of an object in the second portion of the FOV based on a difference between the first detection time and the second detection time being greater than the predetermined threshold.

For instance, if the first-detector light pulse and the second-detector light pulse were detected at same (or substantially similar) times, then a device of method 400 may determine that detection of the second-detector light pulse (e.g., "ghost" detection, etc.) was caused by the presence of the retroreflector in the first portion of the FOV illuminated by the first emitter. Whereas, for instance, if the first-detector light pulse and the second-detector light pulse were detected at substantially different times, then the device may determine that the second-detector light pulse was caused by light from the second portion of the FOV illuminated by the second emitter.

To that end, the value of the predetermined threshold may depend on a variety of factors, such as error tolerances in the timing, delay, analog-to-digital data conversion times, optical assembly distortions (e.g., delays caused by receive optics such as lens, mirrors, etc.), or any other variable that affects the accuracy of the detection times measured for signals from the first detector and the second detector. In one embodiment, the predetermined threshold may be 0 nanoseconds. For instance, the device of method 400 may determine that the second-detector light pulse is associated with the presence of the retroreflector in response to the first detector time and the second detector time corresponding to a same detection time. In another embodiment, the predetermined threshold may be 0.1 nanoseconds (ns), 0.2 ns, 0.3 ns, 0.4 ns, or any other value that would account for potential errors in measuring the detection times of the first-detector light pulse and/or the second-detector light pulse.

Figure 5:
FIG. 5 is a flowchart of another method, according to example embodiments.

FIG. 5 is a flowchart of another method 500, according to example embodiments. Method 500 presents an embodiment of a method that could be used with any of devices 100 and/or 200, for example. Method 500 may include one or more operations, functions, or actions as illustrated by one or more of blocks 502-504. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, method 500 involves transmitting a first plurality of beams toward respective portions of a field-of-view (FOV) during a first emission time period associated with a first scan of the FOV. Referring back to FIG. 3 for example, a LIDAR transmitter may transmit the plurality of light beams 302, 304, 306, 308, 312, 318, etc., that are spatially arranged to illuminate respective portions of FOV 300. For instance, transmitter 106 (of device 100) may emit the first plurality of light beams in a particular spatial arrangement (e.g., spatial arrangement of the beams shown in FIG. 3, etc.).

In some implementations, method 500 also involves transmitting a second plurality of beams to illuminate the respective portions of the FOV during a second emission time period associated with a second scan of the FOV. Continuing with the example of FIG. 3, a device of method 500 may emit the plurality of light beams 302, 304, 306, 308, 312, 318, etc., shown in FIG. 3 during the first scan of FOV 300. In this example, the device may then emit the second plurality of beams (in a similar spatial arrangement) during the second scan of FOV 300.

At block 504, method 500 involves illuminating a first portion of the FOV at a first-portion time offset, and a second portion of the FOV at a second-portion time offset. Referring back to FIG. 3 for example, beams 302 and 304 may correspond to the first portion of the FOV illuminated at a the first-portion time offset (e.g., t=100 ns) from a start time (or end time) of the first emission time period, and beams 306 and 308 may correspond to the second portion of the FOV illuminated at the second-portion time offset (e.g., t=200 ns) from the start time (or end time) of the first emission time period. Thus, continuing with the example of FIG. 3, transmitter 106 (of device 100) may be configured to emit a first light beam (e.g., beam 302) of the first plurality of light beams toward a first portion of the FOV at the first-portion time offset, and a second light beam (e.g., beam 306) of the first plurality of light beams toward the second portion of the FOV at the second-portion time offset.

In some implementations, method 500 may also involve illuminating the first portion of the FOV at a modified first-portion time offset from a start time (or end time) of a second emission time period of a second scan of the FOV (after the first scan). In line with the discussion above for instance, the modified first-portion time offset (e.g., 100 ns) may thus be different from the first-portion time offset (e.g., 400 ns) associated with the first scan. Continuing with the example of FIG. 3, transmitter 106 may be configured to emit (during the second emission time period) a second plurality of light beams in the same spatial arrangement shown in FIG. 3, but while using different time offsets between the emission times of the beams (than the time offsets used between the emission times of the beams in the first scan). For instance, a third light beam of the second plurality of light beams may be similar to beam 302 (e.g., at a same position in the spatial arrangement of the beams) but at the modified first-portion time offset from a start time of the second emission time period as compared to the first-portion time offset used for emitting beam 302 during the first scan.

Thus, in some implementations, method 500 may involve emitting the first plurality of light beams (associated with the first scan) in a particular spatial arrangement, and emitting the second plurality of light beams (associated with the second scan) in the (same) particular spatial arrangement. For example, during the first scan, a first light beam (e.g., beam 302) of the first plurality of light beams (of the first scan) may have a first position in the particular spatial arrangement, and a second light beam (e.g., beam 306) of the first plurality of light beams may have a second position in the particular spatial arrangement. Further, during the second scan or example, a third light beam (e.g., another beam similar to beam 302) of the second plurality of light beams (of the second scan) may have the first position in the particular spatial arrangement, and a fourth light beam (e.g., another beam similar to beam 306) of the second plurality of light beams may have the second position in the particular spatial arrangement.

In these implementations, method 500 may optionally involve emitting (e.g., during the first scan) the first light beam prior to emitting the second light beam, and emitting (e.g., during the second scan) the fourth light beam prior to emitting the third light beam. For example, the order of emission of the light beams in the particular spatial arrangement during the first scan may be different from the order of emission of the light beams in the particular spatial arrangement during the second scan.

In some examples, as noted above, a device of method 500 (e.g., device 100, etc.) may include a transmitter that emits the first plurality of light beams of the first scan in a particular spatial arrangement, and emits the second plurality of light beams of the second scan in the same particular spatial arrangement.

In some implementations, method 500 involves intercepting (e.g., by receiver 114 of device 100, etc.) light from the FOV illuminated by the transmitter. Referring back to FIG. 1 for example, a first detector of detectors 110 may be aligned with a first portion of the FOV illuminated by a first beam of the plurality of beams described at block 502, a second detector of detectors 110 may be aligned with a second portion of the FOV illuminated by a second beam of the plurality of beams, and so on.

IV. EXAMPLE TIMING DIAGRAMS

Figure 6A:
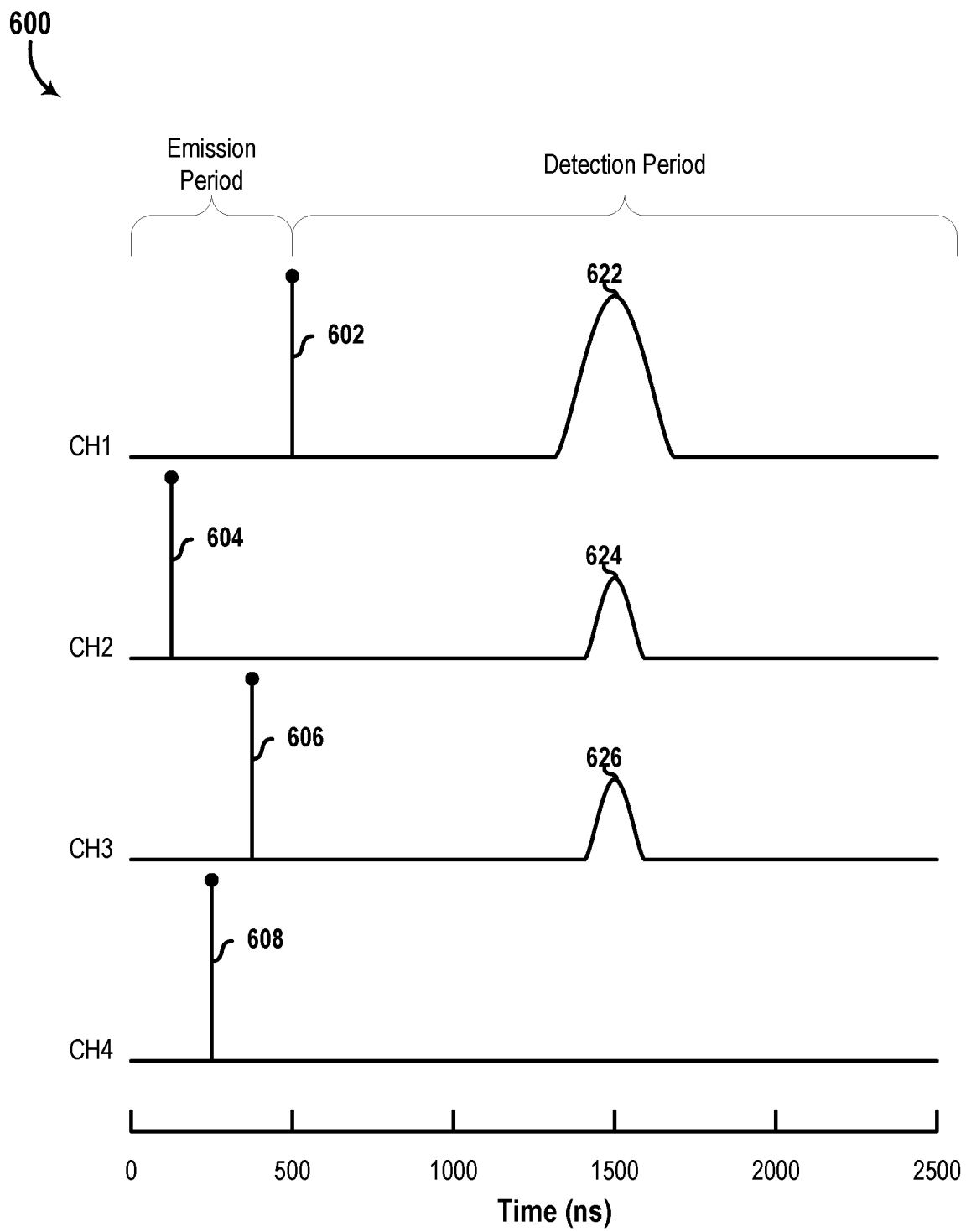
FIG. 6A illustrates conceptual timing diagrams for a first scan of a FOV, according to example embodiments.

FIG. 6A illustrates conceptual timing diagrams for a first scan 600 of a FOV, according to example embodiments. In particular, FIG. 6A shows timing diagrams for transmit/receive signals associated with multiple channels (labeled as CH1, CH2, CH3, CH4) of an example device or system herein (e.g., devices 100, 200, etc.). Each channel may be configured to scan a respective portion of a FOV. Referring back to FIG. 3 for example, transmit signal 602 of CH1 may indicate emission of a pulse or beam 302 at t=500 ns, transmit signal 604 of CH2 may indicate emission of beam 304 at t=125 ns, transmit signal 606 of CH3 may indicate emission of beam 306 at t=375 ns, and transmit signal 608 of CH4 may indicate emission of beam 308 at t=250 ns.

Thus, in line with the discussion above, an example system may scan respective portions of a FOV using a spatial arrangement of transmit/receive channels that emit signals at varying (e.g., dithered, etc.) times within an emission time period of first scan 600. For instance, in the scenario shown, the emission time period (500 ns) of first scan 600 may have a start time of t=0 ns and an end time of t=500 ns. Further, as shown, a detection time period (2000 ns) of first scan 600 begins after the emission period lapses (at t=500 ns).

During the detection time period (e.g., from t=500 ns to t=2500 ns), each channel may listen for returning reflections of its respective transmitted signal. For instance, in the scenario shown, CH1 may detect receive signal 622 at t=1500 ns. Thus, an example system or device herein may determine a distance "d" to an object that reflected a particular receive signal detected by a particular channel as:

$$d = c^*(\text{channel\_detection\_time} - \text{channel\_emission\_time})/2;$$

where c is the speed of light (and/or other signal type of transmit signal 602 such as sound, etc.). Thus, for CH1 in this scenario, $d = c^*(1500 \text{ ns} - 500 \text{ ns})/2 \approx 150$ meters. In turn, an example system that performs the first scan 600 may determine that an object is present in the portion of the FOV scanned by CH1 at a distance of 150 meters from the system. Similarly, the system can determine distances to objects present in respective portions of the FOV scanned by CH2, CH3, CH4 based on the respective channel emission times (e.g., of signals 604, 606, 608) and the respective channel detection times.

As noted above however, in some scenarios, a reflected portion of a transmit signal from a first channel may be spuriously detected by a second channel. For instance, in a scenario where a retroreflector (or other strong reflector) is scanned by the first channel, portions of the reflected signal from the retroreflector may have sufficient energy to be detected by the second channel as well.

For example, consider a scenario where transmit signal 602 is reflected by a retroreflector and detected at CH1 as a (relatively strong) receive signal 622. In this scenario, portions of the reflected signal from the retroreflector may also be detected spuriously at CH2 and CH3 as, respectively, (relatively weaker) receive signals 624 and 626. In some examples, the (spurious) receive signals 624 and 626 may interfere with (and/or prevent) detection of non-spurious receive signals (not shown) that also arrive at t=1500 ns in CH2 and CH3.

However, in line with the discussion above, the effect of the spurious signals on the quality of the scan can be mitigated by varying the respective channel emission times during the emission period. For instance, a system that computes distance to an object associated with spurious signal 624 may determine a distance of d=c*(1500 ns−125 ns)/2≈206 meters in the portion of the FOV scanned by CH2. Similarly, the computing system may compute a distance of d=c*(1500 ns−375 ns)/2≈169 meters for the spurious receive signal 626 in CH3. Thus, with this arrangement, the errors associated with the spurious signal detections 624 and 626 may be spread over a range of distances from the scanning device.

Whereas, in an alternative implementation, if transmit signals 604 (of CH2) and 606 (of CH3) where instead transmitted at the same time (t=500 ns) as the emission time of transmit signal 602 (of CH1), then all three channels (CH1, CH2, CH3) would perceive presence of the retroreflector at the same distance of d=150 meters in their respective portions of the FOV. As a result, in the alternative implementation, a relatively larger portion of the scanned FOV at d=150 meters would be affected by errors associated with the spurious signals, as compared to the implementation described in FIG. 6A (where the respective channel emission times are varied and/or dithered during the emission time period).

As noted above, some example methods herein involve obtaining a sequence of scans of a FOV. For instance, an example system that performs the first scan 600 may then perform a second scan, which begins after the detection period of the first scan lapses (i.e., at or after t=2500 ns), and so on. In some examples, the second scan may have a similar emission period (500 ns), in which each of CH1, CH2, CH3, CH4 emits another respective transmit signal (e.g., pulse, beam, etc.), followed by a similar detection period (2000 ns). In one example, the system may be configured to obtain the sequence of scans periodically. For instance, each scan may be assigned a predetermined scanning period (e.g., 5 microseconds, 10 microseconds, etc.). In some instances, each scanning period may be divided into a series of time windows (e.g., initialization time period, background and/or noise detection time period, signal emission time period, reflected signal detection time period, data collection time period, etc.). However, for convenience in description, FIG. 6A only shows the emission period and the detection period of the first scan 600.

Figure 6B:
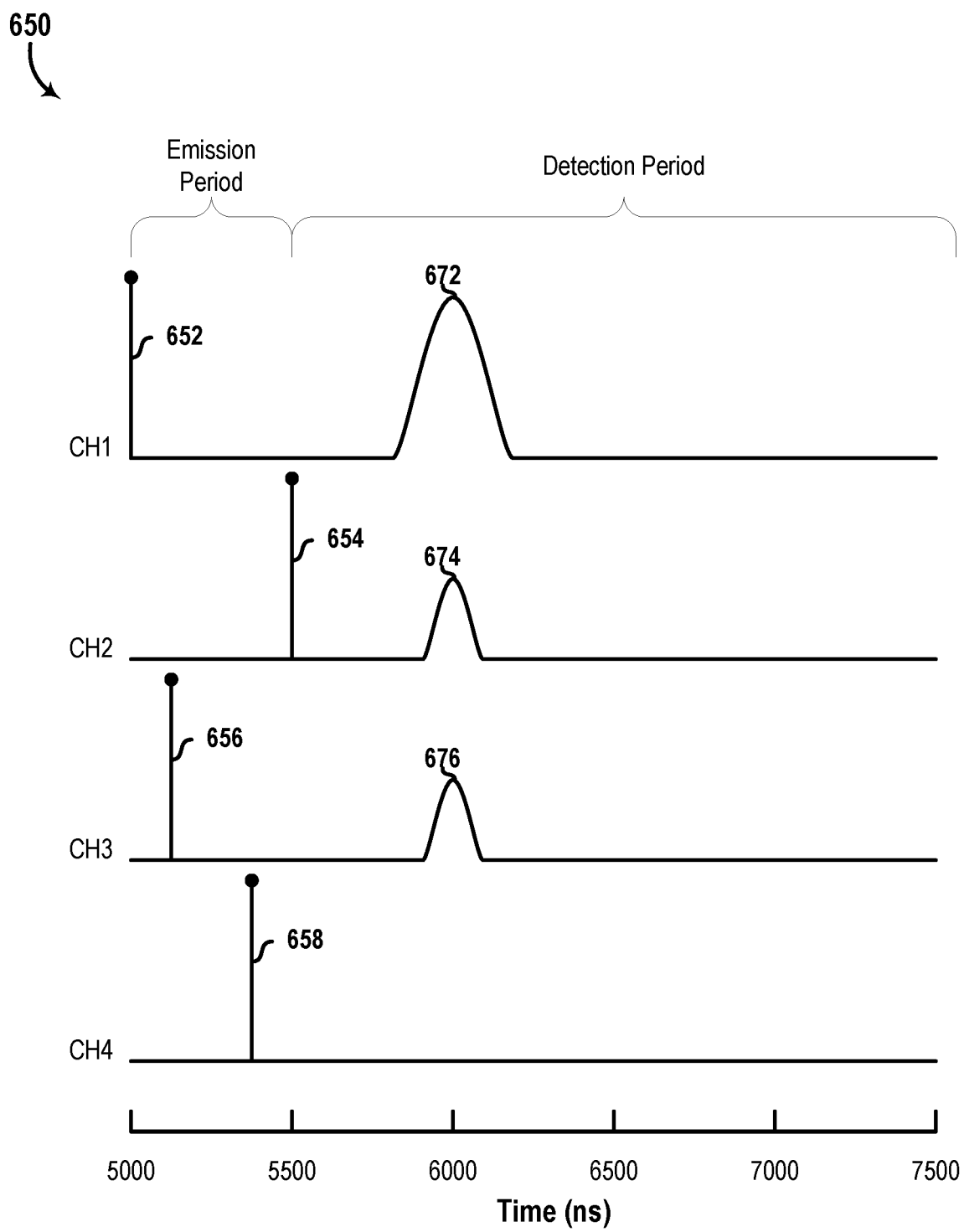
FIG. 6B illustrates conceptual timing diagrams for a second scan of the FOV, according to example embodiments.

FIG. 6B illustrates conceptual timing diagrams for a second scan 650 of the FOV, according to example embodiments. For instance, second scan 650 may be the second scan subsequent to first scan 600 in the sequence of scans described above. To that end, transmit signals 652, 654, 656, 658 and receive signals 672, 674, 676 may be similar, respectively, to transmit signals 602, 604, 606, 608 and receive signals 622, 624, 626 of first scan 600.

Referring back to FIG. 3 for example, transmit signal 652 may indicate emission of another pulse or beam 302 at t=5000 ns, transmit signal 654 of CH2 may indicate emission of another beam 304 at t=5500 ns, transmit signal 656 of CH3 may indicate emission of another beam 306 at t=5125 ns, and transmit signal 658 of CH4 may indicate emission of another beam 308 at t=5375 ns.

As noted above, some example systems herein may obtain the sequence of scans periodically or intermittently. For the sake of example, consider a scenario where the illustrations of FIGS. 6A-6B involve an example system configured to obtain the sequence of scans periodically (i.e., one scan every 5 microseconds). In this scenario, similarly to first scan 600, second scan 650 is shown to have a similar emission period (500 ns) from t=5000 ns to t=5500 ns, followed by a similar detection period (2000 ns) from t=5500 ns to t=7500 ns.

However, as shown, the transmit signals of CH1, CH2, CH3, CH4 are assigned different time offsets within the emission period of second scan 650 as compared to the time offsets assigned to the corresponding transmit signals of first scan 600.

Referring back to FIG. 6A for example, transmit signal 602 (of CH1) is assigned a time offset of 500 ns−0 ns=500 ns from the start time (t=0 ns) of the emission period of first scan 600, transmit signal 604 (of CH2) is assigned a time offset of 125 ns−0 ns=125 ns, transmit signal 606 (of CH3) is assigned a time offset of 375 ns−0 ns=375 ns, and transmit signal 608 (of CH4) is assigned a time offset of 250 ns−0 ns=250 ns.

In contrast, returning now to FIG. 6B, transmit signal 652 (of CH1) is assigned a time offset of 5000 ns−5000 ns=0 ns from the start time (t=5000 ns) of the emission period of second scan 650, transmit signal 654 (of CH2) is assigned a time offset of 5500 ns−5000 ns=500 ns, transmit signal 656 (of CH3) is assigned a time offset of 5125 ns−5000 ns=125 ns, and transmit signal 658 (of CH4) is assigned a time offset of 5375 ns−5000 ns=375 ns.

In some examples, in accordance with the present disclosure, such varying (e.g., dithering) of relative channel emission times within respective emission periods of a sequence of scans may facilitate identification and/or mitigation of errors associated with spurious signal detection. For example, consider the scenario described above for FIG. 6A, where a retroreflector in the portion of the FOV scanned by CH1 causes the detection of non-spurious receive signal 622 in CH1 as well as spurious receive signals 624 (in CH2) and 626 (in CH3) during the first scan 600. Continuing with this scenario, returning now to FIG. 6B, the retroreflector may similarly result in the detection (at t=6000 ns) of non-spurious receive signal 672 (in CH1) and spurious receive signals 674 (in CH2) and 676 (in CH3).

In this scenario, the distance to the retroreflector perceived by CH1 during the second scan 650 may be d=c*(6000−5000)/2≈150 meters, which is the same as the distance computed for CH1 during the first scan 600. However, due to the change in the emission time offsets associated with transmit signals 652, 654, 656, the distances to the retroreflector computed for CH2 and CH3 in the second scan 650 may be different than the corresponding distances computed in the first scan 600. For instance, the distance computed for CH2 in the second scan 650 may be d=c*(6000−5500)/2≈75 meters (compared to 206 meters in the first scan 600); and the distance computed for CH3 in the second scan 650 may be d=c*(6000−5125)/2≈131 meters (compared to 169 meters in the first scan 600).

Thus, with this arrangement for example, consecutive detections of an object that is actually present in a portion of the FOV scanned by a particular channel may remain "coherent" (e.g., the perceived distance to the object may remain substantially the same in consecutive scans by the particular channel). On the other hand, consecutive detections of an object that is not actually present in the portion of the FOV scanned by the particular channel may be "incoherent" (e.g., the perceived distance to the object may change in consecutive scans by the particular channel). In various examples, a system herein can improve the quality of LIDAR sensor data based on the incoherent nature of the spurious signals.

In one example, a device herein may determine that a received signal at a first channel has signal characteristics associated with presence of a retroreflector. For instance, as shown in FIG. 6B, the device may detect that receive signal 672 in CH1 has a signal intensity greater than a threshold (e.g., a sufficiently high intensity expected when a retroreflector is present in the portion of the FOV scanned by the first channel). In response to such determination, the device may identify other signals that were received at other channels (e.g., signals 674 and 676) at a same time (t=6000 ns) when signal 672 was received at the first channel. The device may then store an indication of the identified other signals as potential spurious signal detections by the other channels (CH2 and CH3). Upon further processing of the sensor data from the LIDAR (e.g., by a computing device, etc.) for instance, the potential spurious signal detections can be removed from the sensor data (or otherwise modified) if the received signal at the first channel is determined to be a reflection from a retroreflector.

Additionally, due to the incoherent nature of the potential spurious signals, the effect of removing the spurious signals on the quality of sensor data from a particular channel can be mitigated. Referring back to FIG. 6A for example, removal of data associated with spurious signal 624 may result in a missing measurement from CH2 at the distance of 206 meters in the first scan 600. However, during the second scan 650, CH2 can scan for objects at the distance of 206 meters even if spurious signal 674 is also removed because spurious signal 674 corresponds to a distance of 75 meters in the second scan 650 (instead of a distance of 206 meters). On the other hand, if spurious signals 624 and 674 were instead coherent, then CH2 would be blinded from detecting true objects at a particular distance (e.g., 75 meters) during several consecutive scans by CH2.

Accordingly, some example methods herein (e.g., methods 400, 500) may involve determining that a first signal received by a first detector has an intensity greater than a threshold, identifying one or more additional signals received by one or more other detectors at a same time as a time of receipt of the first signal, and storing an indication of the one or more additional signals.

Alternatively or additionally, some example methods herein (e.g., methods 400, 500) may involve identifying an error detection based on a comparison of sensor data collected during a sequence of scans of a FOV. Referring back to FIG. 1 for example, a computing device (e.g., controller 104) may compare distance measurements obtained using a first detector of detectors 110 in a plurality of successive scans of the sequence of scans. If the distance measurements indicated by the first detector are coherent (e.g., within a threshold tolerance range), then the computing device may determine that the measurements associated with the plurality of scans indicate presence of an actual object in the portion of the FOV scanned by the first detector. Whereas, if the distance measurements are incoherent (e.g., outside the threshold tolerance range), then the computing device may determine that the measurements may be associated with channel cross-talk or other source of noise.

To that end, in some examples, a method herein (e.g., methods 400, 500) may also involve filtering sensor data obtained from a receiver (e.g., receiver 114) based on a comparison of distance measurements associated with the sequence of scans. For example, the sensor data can be pruned to remove given data associated with spurious signals (associated with incoherent distance measurements in successive scans of the sequence of scans). For instance, referring back to FIG. 1, device 100 may analyze the sensor data to remove data points (e.g., signal detections, etc.) that are inconsistent over a given number (e.g., two, three, etc.) of successive scans by a same detector of detectors 110.

In accordance with the present disclosure, the various devices, systems, and methods described herein can be implemented in a variety of different ways.

In one particular implementation, a device herein (e.g., device 100) may include a controller (e.g., controller 104) configured to obtain a sequence of scans (e.g., scans 600, 650, etc.) of a FOV (e.g., FOV 300) of the device. The device may also include a transmitter (e.g., transmitter 106) configured to emit, for a first scan (e.g., scan 600) of the sequence of scans, a first plurality of light pulses (e.g., pulses 602, 604, 606, 608, etc.) in a particular spatial arrangement (e.g., arrangement of beams 302, 304, 306, 308, 312, 318, etc., shown in FIG. 3, or any other arrangement), and according to a first plurality of time offsets between emission times of the plurality of light pulses.

Thus, although some examples herein describe the time offsets as being computed relative to a start time (or end time) of an emission time period, other examples may involve computing the time offsets between the emission times of the emitted pulses/beams, among other possibilities. Referring back to FIG. 6A for example, a first time offset of the plurality may be between pulse 602 and pulse 604 (e.g., 500−125=375 ns), a second time offset may be between pulse 602 and 606 (e.g., 500−375=125 ns), and so on.

Continuing with this implementation, the device may also include a receiver (e.g., receiver 114) that includes a plurality of detectors (e.g., detectors 110). Each detector of the plurality of detectors may be aligned with a respective portion of the FOV illuminated by a respective light pulse of the plurality of light pulses. Referring back to FIG. 3 for example, a first detector of the plurality may be aligned with a first portion of FOV 300 that is illuminated by pulse 302, a second detector may be aligned with a second portion of FOV 300 that is illuminated by pulse 304, and so on. For instance, light from FOV 300 can be focused by one or more optical elements (e.g., optical elements 106), such as lenses and the like, onto an image plane where the plurality of detectors are located. In this instance, the first detector can be located at a region of the image plane where light from the first portion of FOV 300 (illuminated by pulse 302) is focused, and so on.

In some examples, the sequence of scans may include at least the first scan (e.g., scan 600) and a second scan (e.g., scan 650). In these examples, the transmitter may also be configured to emit (for the second scan) a second plurality of light pulses in the same particular spatial arrangement as the first plurality of light pulses (e.g., arrangement shown in FIG. 3, or any other arrangement), and according to a second plurality of time offsets (e.g., different than the first plurality of time offsets used in the first scan). As shown in FIG. 6B for example, a third time offset (of the second plurality of time offsets) may be between light pulses 652 and 654 (e.g., 5000−5500=−500 ns), and so on. Thus, in this example, the time offsets between emission times of the light pulses emitted in CH1 and CH2 may be varied between different scans (e.g., 375 ns in the first scan, −500 ns in the second scan, etc.) in the sequence of scans. Similarly, in some examples, the time offsets between emission times used for light pulses between one or more other pairs of channels (e.g., CH1/CH3, CH1/CH4, CH2/CH3, etc.) can also be varied between scans, in line with the discussion above.

V. CONCLUSION

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A device comprising:
    a plurality of emitters including at least a first emitter and a second emitter, wherein the first emitter emits light that illuminates a first portion of a field-of-view (FOV) of the device, and wherein the second emitter emits light that illuminates a second portion of the FOV; and
    a controller that obtains a scan of the FOV, wherein the controller obtaining the scan of the FOV comprises the controller causing each emitter of the plurality of emitters to emit a respective light pulse during an emission time period associated with the scan, wherein the emission time period has a start time and an end time, and wherein the controller causing each emitter to emit the respective light pulse comprises the controller:
        causing the first emitter to emit a first-emitter light pulse at a first-emitter time offset from the start time of the emission time period, and
        causing the second emitter to emit a second-emitter light pulse at a second-emitter time offset from the start time of the emission time period; and
    a plurality of detectors, wherein the controller obtaining the scan of the FOV comprises the controller operating the plurality of detectors to measure light from the FOV incident on the plurality of detectors during a detection time period that begins after the end time of the emission time period.

2. The device of claim 1, further comprising:
    a lens that focuses the light from the FOV for receipt by the plurality of detectors, wherein a first detector of the plurality of detectors is arranged to intercept a first portion of the focused light that includes a reflection of the light emitted by the first emitter, and wherein a second detector of the plurality of detectors is arranged to intercept a second portion of the focused light that includes a reflection of the light emitted by the second emitter.

3. The device of claim 1, wherein a difference between the first-emitter time offset and the second-emitter time offset is at least 2.5 nanoseconds.

4. The device of claim 1, wherein the scan obtained by the controller is a first scan, wherein the controller obtains a sequence of scans of the FOV including at least the first scan and a second scan subsequent to the first scan.

5. The device of claim 4, wherein the controller obtaining the second scan comprises the controller modifying the first-emitter time offset.

6. The device of claim 5, wherein the controller obtaining the second scan further comprises the controller modifying the second-emitter time offset.

7. The device of claim 6, wherein the emission time period of the first scan is a first emission time period, and wherein the controller obtaining the second scan comprises the controller:
    causing the first emitter to emit another first-emitter light pulse at the modified first-emitter time offset from a start time of a second emission time period associated with the second scan; and
    causing the second emitter to emit another second-emitter light pulse at the modified second-emitter time offset from the start time of the second emission time period.

8. The device of claim 4, wherein the controller determines a pseudo-random time offset sequence, and wherein the controller adjusts the first-emitter time offset for one or more scans of the sequence of scans according to the determined pseudo-random time offset sequence.

9. The device of claim 8, wherein the sequence of scans is a first sequence of scans, wherein the controller obtains a second sequence of scans of the FOV after the first sequence of scans, and wherein the controller adjusts the second-emitter time offset for one or more scans of the second sequence of scans according to the determined pseudo-random time offset sequence.

10. The device of claim 1, further comprising:
    a transmitter that includes the plurality of emitters, wherein the transmitter transmits, during the emission time period of the scan, a plurality of light beams in a spatial arrangement that defines the FOV of the device, wherein the light emitted by the first emitter includes at least a first light beam of the plurality of light beams, and wherein the light emitted by the second emitter includes at least a second light beam of the plurality of light beams.

11. The device of claim 10, wherein the light emitted by the first emitter also includes a third light beam of the plurality of light beams.

12. The device of claim 11, further comprising one or more optical elements that direct: a first portion of the light emitted by the first emitter toward a first position of the first light beam in the spatial arrangement, and a second portion of the light emitted by the first emitter toward a second position of the third light beam in the spatial arrangement.

13. A method comprising:
    causing a plurality of emitters to emit a plurality of light pulses during a first emission time period associated with a first scan of a field-of-view (FOV), wherein a first emitter of the plurality of emitters is configured to illuminate a first portion of the FOV, wherein a second emitter of the plurality of emitters is configured to illuminate a second portion of the FOV, and wherein causing the plurality of emitters to emit the plurality of light pulses comprises:
        causing the first emitter to emit a first-emitter light pulse at a first-emitter time offset from an end time of the first emission time period, and
        causing the second emitter to emit a second-emitter light pulse at a second-emitter time offset from the end time of the first emission time period; and
    obtaining the first scan based on measurements of light from the FOV received by a plurality of detectors during a first detection time period that begins after the end time of the first emission time period.

14. The method of claim 13, further comprising:
obtaining a sequence of scans of the FOV including at least the first scan and a second scan subsequent to the first scan; and
modifying the first-emitter time offset for the second scan, wherein obtaining the second scan comprises causing the first emitter to emit another first-emitter light pulse at the modified first-emitter time offset from an end time of a second emission time period associated with the second scan, and
wherein obtaining the second scan is based on measurements of light from the FOV received by the plurality of detectors during a second detection time period that begins after the end time of the second emission time period.

15. The method of claim 14, further comprising:
modifying, for the second scan, the second-emitter time offset, wherein obtaining the second scan comprises causing the second emitter to emit another second-emitter light pulse at the modified second-emitter time offset from the end time of the second emission time period.

16. The method of claim 13, further comprising:
determining a pseudo-random time offset sequence;
obtaining a sequence of scans of the FOV including the first scan; and
selecting, for each scan of the sequence of scans, the first-emitter time offset from the pseudo-random time offset sequence based on an order of the scan in the sequence of scans.

17. The method of claim 13, wherein a first detector of the plurality of detectors is arranged to receive light from the first portion of the FOV illuminated by the first emitter, the method further comprising:
detecting, via the first detector, a first-detector light pulse at a first detection time during the first detection time period; and
associating the first-detector light pulse with presence of a retroreflector in the first portion of the FOV illuminated by the first emitter.

18. The method of claim 17, wherein associating the first-detector light pulse with presence of the retroreflector is based on at least an intensity of the first-detector light pulse being greater than a threshold intensity.

19. The method of claim 18, further comprising:
determining the threshold intensity based on the first-emitter time offset and the first detection time.

20. The method of claim 17, wherein a second detector of the plurality of detectors is arranged to measure light from the second portion of the FOV illuminated by the second emitter, the method further comprising:
detecting, via the second detector, a second-detector light pulse at a second detection time during the first detection time period.

21. The method of claim 20, further comprising:
based on the first detection time being within a predetermined threshold to the second detection time, associating the second-detector light pulse with the presence of the retroreflector in the first portion of the FOV.

22. The method of claim 20, further comprising:
based on a difference between the first detection time the second detection time being greater than a predetermined threshold, associating the second-detector light pulse with presence of an object in the second portion of the FOV.

23. A device comprising:
a transmitter that emits, during a first emission time period associated with a first scan of a field-of-view (FOV) of the device, a first plurality of light beams spatially arranged to illuminate respective portions of the FOV, wherein the first emission time period has a start time and an end time,
wherein the transmitter emits a first light beam of the first plurality of light beams toward a first portion of the FOV at a first-portion time offset from the start time of the first emission time period, and wherein the transmitter emits a second light beam of the first plurality of light beams toward a second portion of the FOV at a second-portion time offset from the start time of the first emission time period;
a receiver that intercepts light from the FOV illuminated by the transmitter; and
a controller that operates the transmitter and the receiver to obtain the first scan, wherein the controller operating the receiver comprises the controller obtaining, from the receiver, measurements of the light from the FOV intercepted by the receiver during a detection time period that begins after the end time of the first emission time period.

24. The device of claim 23, wherein the transmitter emits, during a second emission time period associated with a second scan of the FOV, a second plurality of light beams.

25. The device of claim 24, wherein the transmitter emits a third light beam of the second plurality of light beams toward the first portion of the FOV at a modified first-portion time offset from a start time of the second emission time period that is different than the first-portion time offset associated with the first scan.

26. The device of claim 24, wherein the transmitter emits the first plurality of light beams in a particular spatial arrangement, and emits the second plurality of light beams in the particular spatial arrangement,
wherein the first light beam of the first plurality of light beams has a first position in the particular spatial arrangement, wherein the second light beam of the first plurality of light beams has a second position in the particular spatial arrangement,
wherein a third light beam of the second plurality of light beams has the first position in the particular spatial arrangement, wherein a fourth light beam of the second plurality of light beams has the second position in the particular spatial arrangement,
wherein the transmitter, during the first scan, emits the first light beam prior to emitting the second light beam, and
wherein the transmitter, during the second scan, emits the fourth light beam prior to emitting the third light beam.

27. The device of claim 23, further comprising a controller that obtains a sequence of scans of the FOV including the first scan, wherein the controller determines a pseudo-random time offset sequence, and wherein the controller obtaining the sequence of scans comprises the controller adjusting the first-portion time offset for each scan of the sequence of scans according to the determined pseudo-random time offset sequence.

28. A device comprising:
a controller that obtains a sequence of scans of a field-of-view (FOV) of the device;
a transmitter that emits, for a first scan of the sequence of scans, a first plurality of light pulses in a particular spatial arrangement and according to a first plurality of time offsets between emission times of the first plurality of light pulses during a first emission time period, wherein the first emission time period has a start time and an end time; and a receiver that includes a plurality of detectors, wherein each detector of the plurality of detectors is aligned with a respective portion of the FOV illuminated by a respective light pulse of the first plurality of light pulses, and wherein the receiver measures light from the FOV incident on the plurality of detectors during a first detection time period that begins after the end time of the first emission time period.

29. The device of claim 28, wherein the sequence of scans includes at least the first scan and a second scan subsequent to the first scan, and wherein the transmitter emits, for the second scan, a second plurality of light pulses in the particular spatial arrangement and according to a second plurality of time offsets between emission times of the second plurality of light pulses during a second emission time period.

\* \* \* \* \*